US012183265B2

(12) United States Patent
Tomizawa et al.

(10) Patent No.: US 12,183,265 B2
(45) Date of Patent: Dec. 31, 2024

(54) DISPLAY DEVICE

(71) Applicant: Japan Display Inc., Tokyo (JP)

(72) Inventors: Kazunari Tomizawa, Tokyo (JP); Kazuhiko Sako, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/241,575

(22) Filed: Sep. 1, 2023

(65) Prior Publication Data

US 2024/0078965 A1 Mar. 7, 2024

(30) Foreign Application Priority Data

Sep. 5, 2022 (JP) ................................ 2022-140834

(51) Int. Cl.
*G09G 3/32* (2016.01)

(52) U.S. Cl.
CPC ....... *G09G 3/32* (2013.01); *G09G 2300/0842* (2013.01); *G09G 2310/08* (2013.01); *G09G 2320/0233* (2013.01); *G09G 2320/0626* (2013.01); *G09G 2320/0673* (2013.01)

(58) Field of Classification Search
CPC ............. G09G 3/32; G09G 2300/0842; G09G 2310/08; G09G 2320/0233; G09G 2320/0626; G09G 2320/0673; G09G 3/3413; G09G 3/3216; G09G 3/3233
USPC .................................................. 345/76, 589
See application file for complete search history.

(56) References Cited

U.S. PATENT DOCUMENTS

| | | | | |
|---|---|---|---|---|
| 2005/0116904 A1* | 6/2005 | Adachi | ................ | G09G 3/3216 345/76 |
| 2014/0043353 A1* | 2/2014 | Ishihara | ............... | G09G 3/3413 345/589 |
| 2020/0257167 A1* | 8/2020 | Miyata | ................. | G09G 3/3413 |
| 2022/0068196 A1* | 3/2022 | Tomizawa | ........... | G09G 3/3233 |

FOREIGN PATENT DOCUMENTS

| | | |
|---|---|---|
| JP | H11-174410 A | 7/1999 |
| JP | 2003-288055 A | 10/2003 |
| JP | 2022-041743 A | 3/2022 |

* cited by examiner

*Primary Examiner* — Abdul-Samad A Adediran
(74) *Attorney, Agent, or Firm* — K&L Gates LLP

(57) ABSTRACT

A display device includes a plurality of light-emitting elements, and a control circuit configured to control drive of the light-emitting elements. The control circuit divides one frame period into a plurality of subframe periods having different lengths and controls light emission and non-emission of the light-emitting elements for each of the subframe periods.

20 Claims, 29 Drawing Sheets

FIG.12

| GRADATION VALUE | GAMMA VALUE | SF1 - SF10 | SF11 | SF12 |
|---|---|---|---|---|
| 192 | 0.535642 | | | |
| 193 | 0.541798 | | | |
| 194 | 0.547994 | | | |
| 195 | 0.554227 | | | |
| 196 | 0.560499 | | | |
| 197 | 0.566810 | | | |
| 198 | 0.573159 | | | |
| 199 | 0.579547 | | | |
| 200 | 0.585973 | | | |
| 201 | 0.592438 | | | |
| 202 | 0.598942 | | | |
| 203 | 0.605484 | | | |
| 204 | 0.612066 | | | |
| 205 | 0.618686 | | | |
| 206 | 0.625345 | | | |
| 207 | 0.632043 | | | |
| 208 | 0.638779 | | | |
| 209 | 0.645555 | | | |
| 210 | 0.652370 | | | |
| 211 | 0.659224 | | | |
| 212 | 0.666117 | | | |
| 213 | 0.673049 | | | |
| 214 | 0.680020 | | | |
| 215 | 0.687031 | | | |
| 216 | 0.694081 | | | |
| 217 | 0.701170 | | | |
| 218 | 0.708298 | | | |
| 219 | 0.715465 | | | |
| 220 | 0.722672 | | | |
| 221 | 0.729919 | | | |
| 222 | 0.737205 | | | |
| 223 | 0.744530 | | | |

FIG.13

| GRADATION VALUE | GAMMA VALUE | SF1 - SF10 | SF11 | SF12 |
|---|---|---|---|---|
| 224 | 0.751895 | | | |
| 225 | 0.759300 | | | |
| 226 | 0.766744 | | | |
| 227 | 0.774227 | | | |
| 228 | 0.781751 | | | |
| 229 | 0.789314 | | | |
| 230 | 0.796917 | | | |
| 231 | 0.804559 | | | |
| 232 | 0.812241 | | | |
| 233 | 0.819964 | | | |
| 234 | 0.827726 | | | |
| 235 | 0.835528 | | | |
| 236 | 0.843370 | | | |
| 237 | 0.851252 | | | |
| 238 | 0.859174 | | | |
| 239 | 0.867136 | | | |
| 240 | 0.875138 | | | |
| 241 | 0.883180 | | | |
| 242 | 0.891262 | | | |
| 243 | 0.899385 | | | |
| 244 | 0.907547 | | | |
| 245 | 0.915750 | | | |
| 246 | 0.923993 | | | |
| 247 | 0.932277 | | | |
| 248 | 0.940601 | | | |
| 249 | 0.948965 | | | |
| 250 | 0.957370 | | | |
| 251 | 0.965815 | | | |
| 252 | 0.974300 | | | |
| 253 | 0.982826 | | | |
| 254 | 0.991393 | | | |
| 255 | 1.000000 | | | |

FIG.14

| GRADATION VALUE | GAMMA VALUE | SF1 | SF2 | SF3 | SF4 | SF5 | SF6 |
|---|---|---|---|---|---|---|---|
| 0 | 0.000000 | 0 | 0 | 0 | 0 | 0 | 0 |
| 1 | 0.000005 | 0.033 | 0.033 | 0 | 0 | 0 | 0 |
| 2 | 0.000023 | 0.1 | 0.1 | 0 | 0 | 0 | 0 |
| 3 | 0.000057 | 0.33 | 0.33 | 0 | 0 | 0 | 0 |
| 4 | 0.000107 | 0 | 0.33 | 0.33 | 0 | 0 | 0 |
| 5 | 0.000175 | 0 | 0 | 0 | 0.33 | 0 | 0 |
| 6 | 0.000262 | 0 | 0 | 1.0 | 0 | 0 | 0 |
| 7 | 0.000367 | 0 | 1.0 | 1.0 | 0 | 0 | 0 |
| 8 | 0.000493 | 0 | 0 | 0 | 1.0 | 0 | 0 |
| 9 | 0.000638 | 0 | 1.0 | 0 | 1.0 | 0 | 0 |
| 10 | 0.000805 | 1.0 | 0 | 1.0 | 1.0 | 0 | 0 |
| 11 | 0.000992 | 0 | 0 | 0 | 0 | 1.0 | 0 |
| 12 | 0.001202 | 1.0 | 1.0 | 0 | 0 | 1.0 | 0 |
| 13 | 0.001433 | 1.0 | 1.0 | 1.0 | 0 | 1.0 | 0 |
| 14 | 0.001687 | 1.0 | 1.0 | 0 | 1.0 | 1.0 | 0 |
| 15 | 0.001963 | 0 | 0 | 0 | 0 | 0 | 1.0 |
| 16 | 0.002263 | 1.0 | 0 | 1.0 | 0 | 0 | 1.0 |

(mA)

FIG.22

| GRADATION VALUE | GAMMA VALUE | SF1 | SF2 | SF3 | SF4 | SF5 | SF6 |
|---|---|---|---|---|---|---|---|
| 0 | 0.000000 | 0 | 0 | 0 | 0 | 0 | 0 |
| 1 | 0.000005 | 0.033 | 0 | 0 | 0 | 0 | 0 |
| 2 | 0.000023 | 0.1 | 0 | 0 | 0 | 0 | 0 |
| 3 | 0.000057 | 0.1 | 0.1 | 0 | 0 | 0 | 0 |
| 4 | 0.000107 | 0.1 | 0 | 0.1 | 0 | 0 | 0 |
| 5 | 0.000175 | 0.1 | 0.1 | 0.1 | 0 | 0 | 0 |
| 6 | 0.000262 | 0.1 | 0.1 | 0 | 0.1 | 0 | 0 |
| 7 | 0.000367 | 0.1 | 0.1 | 0.1 | 0.1 | 0 | 0 |
| 8 | 0.000493 | 0 | 0.33 | 0.33 | 0 | 0 | 0 |
| 9 | 0.000638 | 0.33 | 0 | 0 | 0.33 | 0 | 0 |
| 10 | 0.000805 | 0.33 | 0.33 | 0 | 0.33 | 0 | 0 |
| 11 | 0.000992 | 0.33 | 0 | 0.33 | 0.33 | 0 | 0 |
| 12 | 0.001202 | 1.0 | 0 | 1.0 | 0 | 0 | 0 |
| 13 | 0.001433 | 0 | 1.0 | 1.0 | 0 | 0 | 0 |
| 14 | 0.001687 | 1.0 | 1.0 | 1.0 | 0 | 0 | 0 |
| 15 | 0.001963 | 0 | 0 | 0 | 1.0 | 0 | 0 |
| 16 | 0.002263 | 1.0 | 0 | 0 | 1.0 | 0 | 0 |

(mA)

FIG.24

| No. | LUMINANCE | SF1 | SF2 | SF3 | SF4 | EVALUATION | GRADATION VALUE | IDEAL LUMINANCE |
|---|---|---|---|---|---|---|---|---|
| 0 | 0.000000 | 0 | 0 | 0 | 0 | | 0 | 0.000000 |
| 1 | 0.000008 | 0.033 | 0 | 0 | 0 | | 1 | 0.000005 |
| 2 | 0.000016 | 0 | 0.033 | 0 | 0 | | | |
| 3 | 0.000024 | 0.033 | 0.033 | 0 | 0 | | 2 | 0.00023 |
| | 0.000024 | 0.1 | 0 | 0 | 0 | × | | |
| 4 | 0.000033 | 0 | 0 | 0.033 | 0 | | | |
| 5 | 0.000041 | 0.033 | 0 | 0.033 | 0 | | | |
| 6 | 0.000049 | 0 | 0.033 | 0.033 | 0 | | | |
| | 0.000049 | 0 | 0.1 | 0 | 0 | × | | |
| 7 | 0.000057 | 0.033 | 0.033 | 0.033 | 0 | | 3 | 0.000057 |
| 8 | 0.000065 | 0 | 0 | 0 | 0.033 | | | |
| 9 | 0.000073 | 0.033 | 0 | 0 | 0.033 | | | |
| | 0.000073 | 0.1 | 0.1 | 0 | 0 | × | | |
| 10 | 0.000081 | 0 | 0.033 | 0 | 0.033 | | | |
| | 0.000081 | 0.33 | 0 | 0 | 0 | × | | |
| 11 | 0.000090 | 0.033 | 0.033 | 0 | 0.033 | | | |
| 12 | 0.000098 | 0 | 0 | 0.033 | 0.033 | | | |
| | 0.000098 | 0 | 0 | 0.1 | 0 | × | | |
| 13 | 0.000106 | 0.033 | 0 | 0.033 | 0.033 | | 4 | 0.000107 |
| 14 | 0.000114 | 0 | 0.033 | 0.033 | 0.033 | | | |
| 15 | 0.000122 | 0.033 | 0.033 | 0.033 | 0.033 | △ | | |
| | 0.000122 | 0.1 | 0 | 0.1 | 0 | △ | | |
| 16 | 0.000146 | 0 | 0.1 | 0.1 | 0 | | | |
| 17 | 0.000163 | 0 | 0.33 | 0 | 0 | × | | |
| 18 | 0.000171 | 0.1 | 0.1 | 0.1 | 0 | | 5 | 0.000175 |

(mA)

FIG.25

| No. | LUMINANCE | SF1 | SF2 | SF3 | SF4 | EVALUATION | GRADATION VALUE | IDEAL LUMINANCE |
|---|---|---|---|---|---|---|---|---|
| 19 | 0.000195 | 0 | 0 | 0 | 0.1 | | | |
| 20 | 0.000220 | 0.1 | 0 | 0 | 0.1 | | | |
| 21 | 0.000244 | 0 | 0.1 | 0 | 0.1 | | | |
| | 0.000244 | 0.33 | 0.33 | 0 | 0 | × | | |
| | 0.000244 | 1.0 | 0 | 0 | 0 | × | | |
| 22 | 0.000269 | 0.1 | 0.1 | 0 | 0.1 | | 6 | 0.000262 |
| 23 | 0.000293 | 0 | 0 | 0.1 | 0.1 | | | |
| 24 | 0.000317 | 0.1 | 0 | 0.1 | 0.1 | | | |
| | 0.000326 | 0 | 0 | 0.33 | 0 | × | | |
| 25 | 0.000342 | 0 | 0.1 | 0.1 | 0.1 | | 7 | 0.000367 |
| 26 | 0.000366 | 0.1 | 0.1 | 0.1 | 0.1 | | | |
| 27 | 0.000407 | 0.33 | 0 | 0.33 | 0 | | | |
| 28 | 0.000488 | 0 | 0.33 | 0.33 | 0 | | 8 | 0.000493 |
| | 0.000488 | 0 | 1.0 | 0 | 0 | × | | |
| 29 | 0.000570 | 0.33 | 0.33 | 0.33 | 0 | | | |
| 30 | 0.000651 | 0 | 0 | 0 | 0.33 | | 9 | 0.000638 |
| 31 | 0.000732 | 0.33 | 0 | 0 | 0.33 | | | |
| | 0.000732 | 1.0 | 1.0 | 0 | 0 | × | | |
| 32 | 0.000814 | 0 | 0.33 | 0 | 0.33 | | 10 | 0.000805 |
| 33 | 0.000895 | 0.33 | 0.33 | 0 | 0.33 | | | |
| 34 | 0.000977 | 0 | 0 | 0.33 | 0.33 | | 11 | 0.000992 |
| | 0.000977 | 0 | 0 | 1.0 | 0 | × | | |
| 35 | 0.001058 | 0.33 | 0 | 0.33 | 0.33 | | | |
| 36 | 0.001139 | 0 | 0.33 | 0.33 | 0.33 | | | |
| 37 | 0.001221 | 0.33 | 0.33 | 0.33 | 0.33 | Δ | | |
| | 0.001221 | 1.0 | 0 | 1.0 | 0 | Δ | 12 | 0.001202 |
| 38 | 0.001465 | 0 | 1.0 | 1.0 | 0 | | 13 | 0.001433 |

(mA)

FIG.26

| GRADATION VALUE | GAMMA VALUE | SF1 | SF2 | SF3 | SF4 | SF5 | SF6 |
|---|---|---|---|---|---|---|---|
| 0 | 0.000000 | 0 | 0 | 0 | 0 | 0 | 0 |
| 1 | 0.000002 | 0.033 | 0 | 0 | 0 | 0 | 0 |
| 2 | 0.000008 | 0 | 0.033 | 0 | 0 | 0 | 0 |
| 3 | 0.000019 | 0.033 | 0.033 | 0 | 0 | 0 | 0 |
| 4 | 0.000036 | 0.033 | 0 | 0.033 | 0 | 0 | 0 |
| 5 | 0.000058 | 0.033 | 0.033 | 0.033 | 0 | 0 | 0 |
| 6 | 0.000087 | 0.033 | 0.033 | 0 | 0.033 | 0 | 0 |
| 7 | 0.000122 | 0.1 | 0 | 0.1 | 0 | 0 | 0 |
| 8 | 0.000164 | 0.1 | 0.1 | 0.1 | 0 | 0 | 0 |
| 9 | 0.000213 | 0.1 | 0 | 0 | 0.1 | 0 | 0 |
| 10 | 0.000268 | 0.1 | 0.1 | 0 | 0.1 | 0 | 0 |
| 11 | 0.000330 | 0 | 0 | 0.33 | 0 | 0 | 0 |
| 12 | 0.000400 | 0.33 | 0 | 0.33 | 0 | 0 | 0 |
| 13 | 0.000477 | 0 | 0.33 | 0.33 | 0 | 0 | 0 |
| 14 | 0.000562 | 0.33 | 0.33 | 0.33 | 0 | 0 | 0 |
| 15 | 0.000654 | 0 | 0 | 0 | 0.33 | 0 | 0 |
| 16 | 0.000754 | 0.33 | 0 | 0 | 0.33 | 0 | 0 |

(mA)

DISPLAY DEVICE

CROSS-REFERENCE TO RELATED APPLICATION

This application claims the benefit of priority from Japanese Patent Application No. 2022-140834 filed on Sep. 5, 2022, the entire contents of which are incorporated herein by reference.

BACKGROUND

1. Technical Field

The present invention relates to a display device.

2. Description of the Related Art

Widely known are display devices with light-emitting elements, such as inorganic light-emitting diodes (micro LEDs) and organic light-emitting diodes (OLEDs).

Japanese Patent Application Laid-open Publication No. 2022-041743 (JP-A-2022-041743) describes a display device (light-emitting device in JP-A-2022-041743) that performs gradation control by combining analog gradation display and digital gradation display in a display device with such light-emitting elements. Japanese Patent Application Laid-open Publication No. H11-174410 (JP-A-H11-174410) describes a matrix display device that performs gradation display by combining analog drive and digital drive in a liquid crystal display device. Japanese Patent Application Laid-open Publication No. 2003-288055 (JP-A-2003-288055) describes a display device that makes what is called false contours inconspicuous in a time-division display method of controlling light emission in each subframe period.

Such display devices are required to satisfactorily perform gradation control on the low gradation side. In JP-A-2022-041743, the length of the subframe period for analog gradation display is equal to that of the subframe period for digital gradation display, which may possibly make it difficult to achieve fine gradation expression on the low gradation side. JP-A-H11-174410 describes a method for driving the liquid crystal display device, and it is difficult to apply the method to a display device with light-emitting elements without any change. In other words, in JP-A-H11-174410, the selection period in analog drive is set longer than that in digital drive to secure a drive margin of the liquid crystal display device, which may possibly make it difficult to satisfactorily perform gradation control on the low gradation side. JP-A-2003-288055 does not describe gradation control on the low gradation side.

An object of the present invention is to provide a display device that can satisfactorily perform gradation control on the low gradation side.

SUMMARY

A display device according to an embodiment of the present disclosure includes a plurality of light-emitting elements, and a control circuit configured to control drive of the light-emitting elements. The control circuit divides one frame period into a plurality of subframe periods having different lengths and controls light emission and non-emission of the light-emitting elements for each of the subframe periods, the control circuit has, as a system for driving the light-emitting elements, a first display drive system that supplies a fixed high level current to at least one first light-emitting element that emits light among the light-emitting elements and changes the length of a light emission period in which the first light-emitting element emits light, and the control circuit has a second display drive system that supplies one low level current selected from a plurality of low level currents each having a current value smaller than a current value of the high level current and set to different current values to at least one second light-emitting element that emits light among the light-emitting elements and changes the length of the light emission period in which the second light-emitting element emits light.

BRIEF DESCRIPTION OF THE DRAWINGS

FIG. 12 is an enlarged diagram for explaining gradation value 192 to gradation value 223 in FIG. 11;

FIG. 13 is an enlarged diagram for explaining gradation value 224 to gradation value 255 in FIG. 11;

FIG. 14 is a diagram for explaining an example of the light emission sequence for each gradation value (gradation value 0 to gradation value 16) of the display device according to the first embodiment;

FIG. 22 is a diagram for explaining the light emission sequence for each gradation value (gradation value 0 to gradation value 16) of the display device according to the second embodiment;

FIG. 24 is a diagram for explaining an example of a method for setting the current value of each subframe from gradation value 0 to gradation value 5 of the display device according to a second modification of the second embodiment;

FIG. 25 is a diagram for explaining an example of the method for setting the current value of each subframe from gradation value 6 to gradation value 13 of the display device according to the second modification of the second embodiment;

FIG. 26 is a diagram for explaining the light emission sequence for each gradation value (gradation value 0 to gradation value 16) of the display device according to a third modification of the second embodiment;

DETAILED DESCRIPTION

Figure 1:
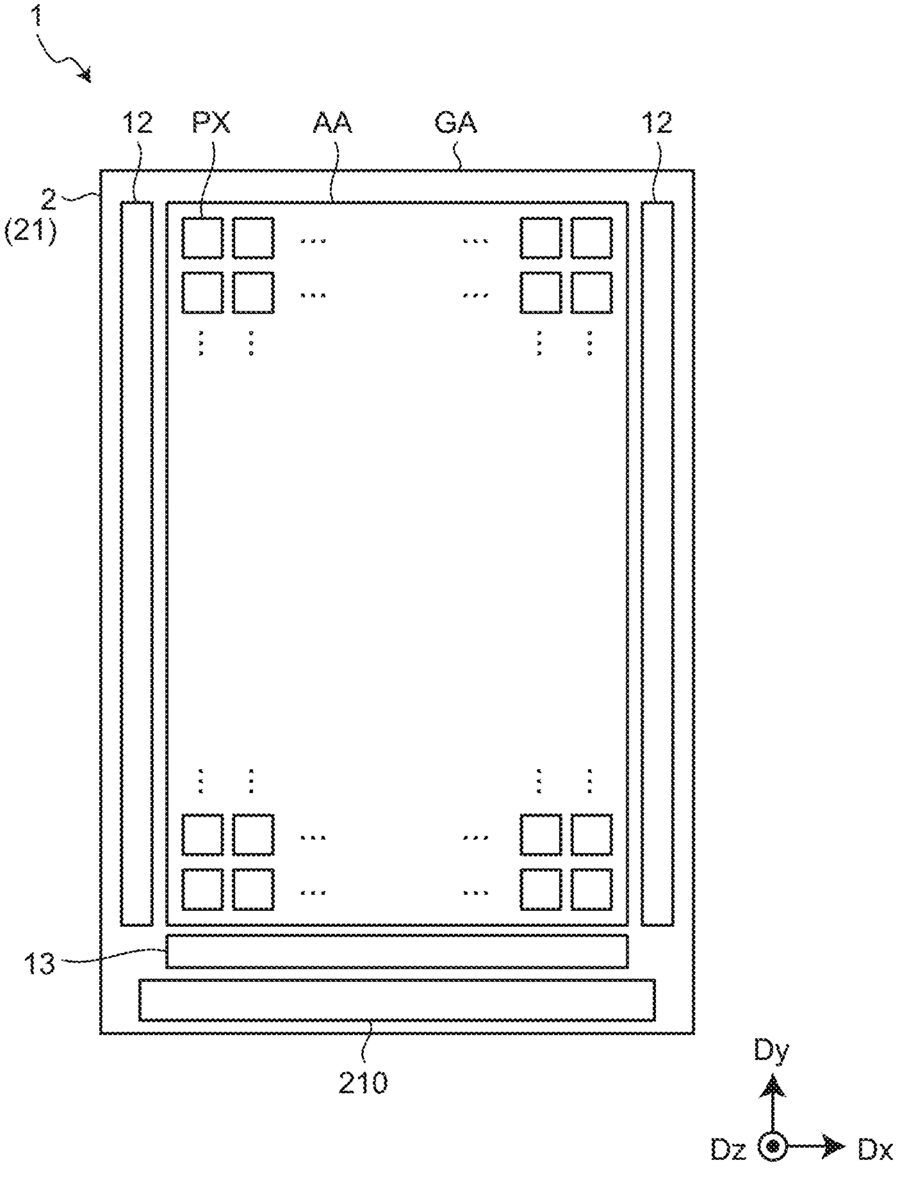
FIG. 1 is a plan view of a display device according to a first embodiment.

Exemplary aspects (embodiments) to embody the present invention are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the drawings, components similar to those previously described with reference to previous drawings are denoted by like reference numerals, and detailed explanation thereof may be appropriately omitted.

First Embodiment

FIG. 1 is a plan view of a display device according to a first embodiment. A display device 1 according to the present embodiment is a micro LED display device with micro LEDs. As illustrated in FIG. 1, the display device 1 includes an array substrate 2, a plurality of pixels PX, a scanning line drive circuit 12, a signal line drive circuit 13, and a drive integrated circuit (IC) 210.

The array substrate 2 is a drive circuit substrate that drives the pixels PX and is also called a backplane or an active matrix substrate. The array substrate 2 is composed of a substrate 21 serving as a base and includes a plurality of thin-film transistors, a plurality of capacitances, various kinds of wiring, and other components on the substrate 21. A wiring substrate (e.g., flexible printed circuits (FPC)) or the like, which is not specifically illustrated, may be coupled on the array substrate 2 to receive various control signals and electric power from an external control substrate.

In the following description, a first direction Dx is one direction in a plane parallel to the substrate 21. A second direction Dy is one direction in the plane parallel to the substrate 21 and is orthogonal to the first direction Dx. The second direction Dy may intersect the first direction Dx without being orthogonal thereto. A third direction Dz is orthogonal to the first direction Dx and the second direction Dy and is the normal direction of the substrate 21. "Plan view" indicates the positional relation viewed from the third direction Dz.

The scanning line drive circuit 12 is a circuit that drives a plurality of scanning lines GL (refer to FIG. 3) based on various control signals from the drive IC 210. The scanning line drive circuit 12 sequentially or simultaneously selects a plurality of scanning lines GL and supplies gate drive signals GS to the selected scanning lines GL. Thus, the scanning line drive circuit 12 selects a plurality of pixels PX coupled to the scanning lines GL.

The signal line drive circuit 13 is a drive circuit that supplies gradation voltage to signal lines SL (refer to FIG. 3) in a display region AA to drive the pixels PX. The gradation voltage is a voltage signal set in advance corresponding to the gradation value (hereinafter, which may be referred to as a target luminance level) of each pixel PX (sub-pixel SPX). The gradation voltage will be described later with reference to FIG. 4.

The drive IC 210 is a circuit that supplies control signals to the scanning line drive circuit 12 and the signal line drive circuit 13 to control display on the pixels PX. At least part of the scanning line drive circuit 12 and the signal line drive circuit 13 may be formed integrally with the drive IC 210. The drive IC 210 is provided on the array substrate 2. The configuration is not limited thereto, and the drive IC 210 may be provided to the wiring substrate coupled to the array substrate 2.

The array substrate 2 has the display region AA and a peripheral region GA. The display region AA is provided with the pixels PX. The pixels PX are arrayed in a matrix (row-column configuration) in the display region AA. The peripheral region GA is a region outside the display region AA and is not provided with the pixels PX. The peripheral region GA is provided with the scanning line drive circuit 12, the signal line drive circuit 13, and the drive IC 210. The scanning line drive circuit 12 is provided in a region extending along the second direction Dy in the peripheral region GA. The signal line drive circuit 13 and the drive IC 210 are provided in a region extending along the first direction Dx in the peripheral region GA.

In the present embodiment, to simplify the explanation, the display region AA has a rectangular shape, and the peripheral region GA has a rectangular frame shape surrounding a periphery of the display region AA. The shapes are not limited thereto, and the display region AA may have a polygonal shape or an irregular shape with cutouts (notches) or curved portions in part of the outer periphery. The peripheral region GA may also have various different shapes corresponding to the shape of the display region AA.

Figure 2:
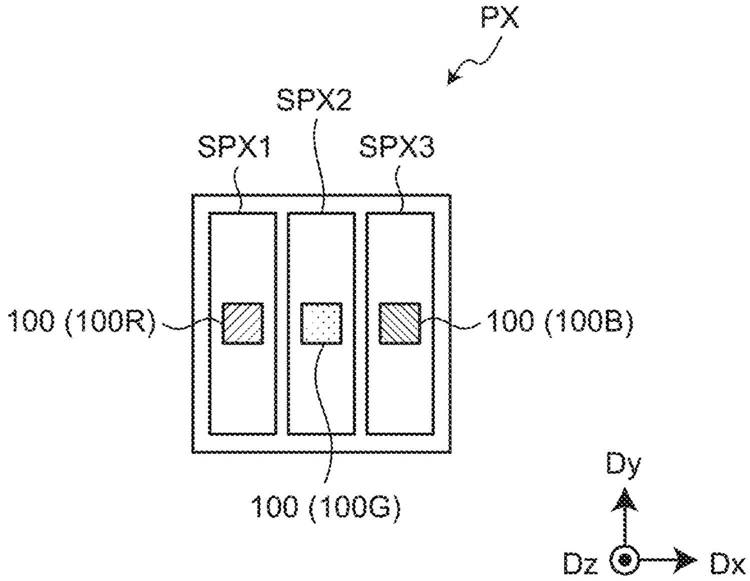
FIG. 2 is a plan view of an example of a pixel of the display device according to the first embodiment.

FIG. 2 is a plan view of an example of the pixel of the display device according to the first embodiment. As illustrated in FIG. 2, the pixel PX includes a first sub-pixel SPX1, a second sub-pixel SPX2, and a third sub-pixel SPX3. The first sub-pixel SPX1, the second sub-pixel SPX2, and the third sub-pixel SPX3 each include a light-emitting element 100. The light-emitting element 100 is an inorganic light-emitting diode (LED) chip having a size of approximately 3 μm to 300 μm in plan view and is called a micro LED. The term "micro" of the micro LED is not intended to limit the size of the light-emitting element 100.

The first sub-pixel SPX1 (light-emitting element 100R) displays red (R), for example. The second sub-pixel SPX2 (light-emitting element 100G) displays green (G), for example. The third sub-pixel SPX3 (light-emitting element 100B) displays blue (B), for example.

In the following description, the first sub-pixel SPX1, the second sub-pixel SPX2, and the third sub-pixel SPX3 are simply referred to as sub-pixels SPX when they need not be distinguished from each other. While the light-emitting element 100 is disposed at the center in each sub-pixel SPX, FIG. 2 only schematically illustrates the configuration, and the position of the light-emitting element 100 in each sub-pixel SPX can be appropriately changed.

The first sub-pixel SPX1, the second sub-pixel SPX2, and the third sub-pixel SPX3 are adjacently disposed in the first direction Dx. The configuration is not limited thereto, and the pixel PX may have other arrangements. For example, the first sub-pixel SPX1 and the second sub-pixel SPX2 may be adjacently disposed in the second direction Dy, and one third sub-pixel SPX3 may be disposed adjacently, in the first direction Dx, to the first sub-pixel SPX1 and the second sub-pixel SPX2 adjacently disposed in the second direction Dy. The pixel PX may be configured in what is called the PenTile arrangement. The pixel PX is not necessarily composed of three sub-pixels SPX and may be composed of four or more sub-pixels SPX.

Figure 3:
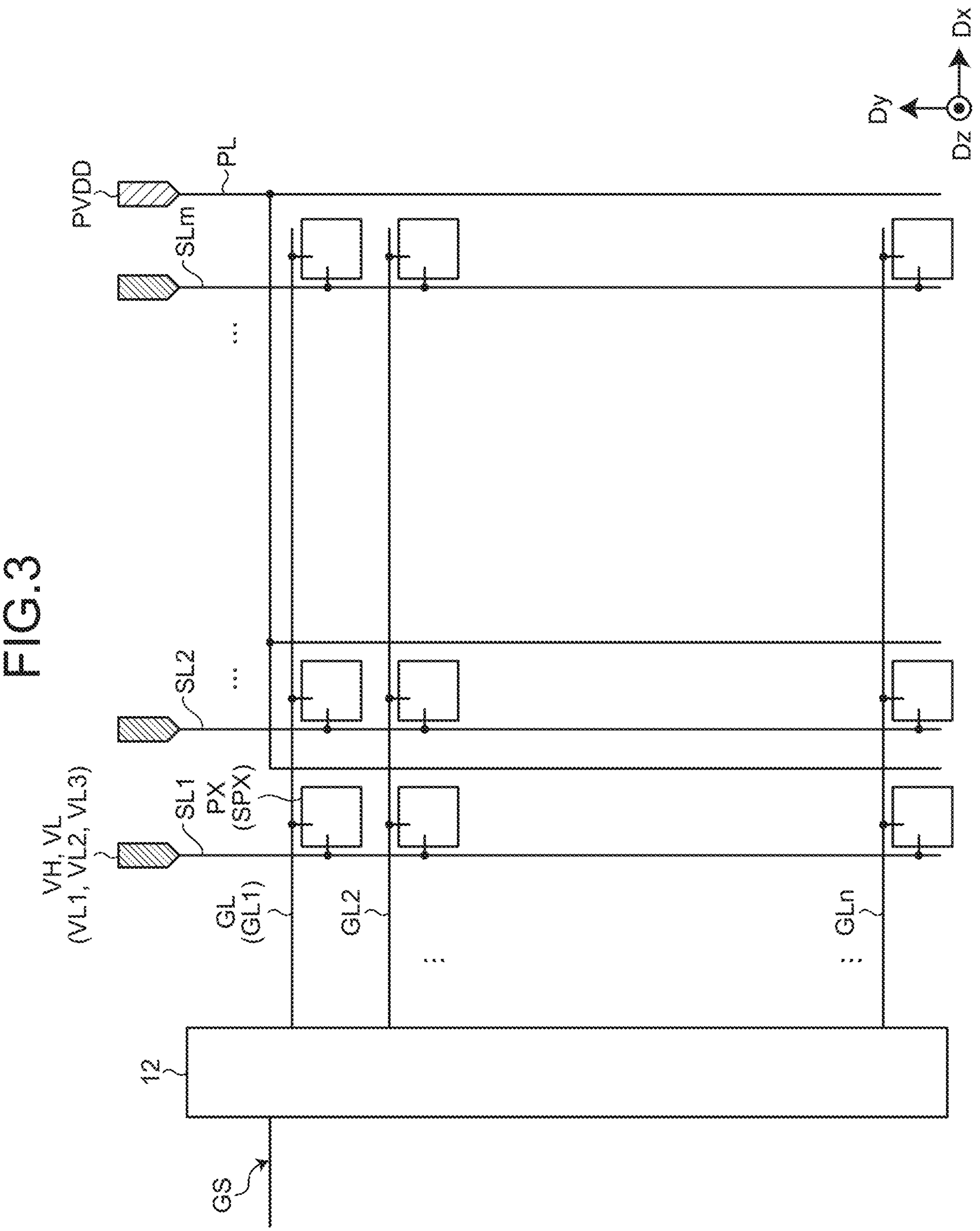
FIG. 3 is a circuit diagram of an exemplary configuration of the display device according to the first embodiment.

FIG. 3 is a circuit diagram of an exemplary configuration of the display device according to the first embodiment. As illustrated in FIG. 3, a plurality of scanning lines GL1, GL2, . . . , and GLn are adjacently disposed in the second direction Dy and each extend in the first direction Dx. The scanning lines GL1, GL2, . . . , and GLn are disposed corresponding to the respective pixel rows. A plurality of signal lines SL1, SL2, . . . , and SLm are adjacently disposed in the first direction Dx and each extend in the second direction Dy. The signal lines SL1, SL2, . . . , and SLm are disposed corresponding to the respective pixel columns. In the present disclosure, a row refers to a pixel row of m pixels PX arrayed in one direction (first direction Dx). A column refers to a pixel column of n pixels PX arrayed in a direction (second direction Dy) orthogonal to the direction in which the row extends.

The scanning line drive circuit 12 is coupled to the scanning lines GL and supplies the gate drive signals GS to each pixel row in a time-division manner. As a result, the light-emitting elements 100 are selected for each of a plurality of subframe periods SF (refer to FIG. 5) in a time-division manner. The signal line drive circuit 13 (refer to FIG. 1) is coupled to the signal lines SL and supplies gradation voltage (high level voltage VH and low level voltages VL1, VL2, and VL3) corresponding to the gradation value to each pixel column. The pixels PX are supplied with power supply voltage PVDD from the drive IC 210 (refer to FIG. 1) via a power supply line PL.

Figure 4:
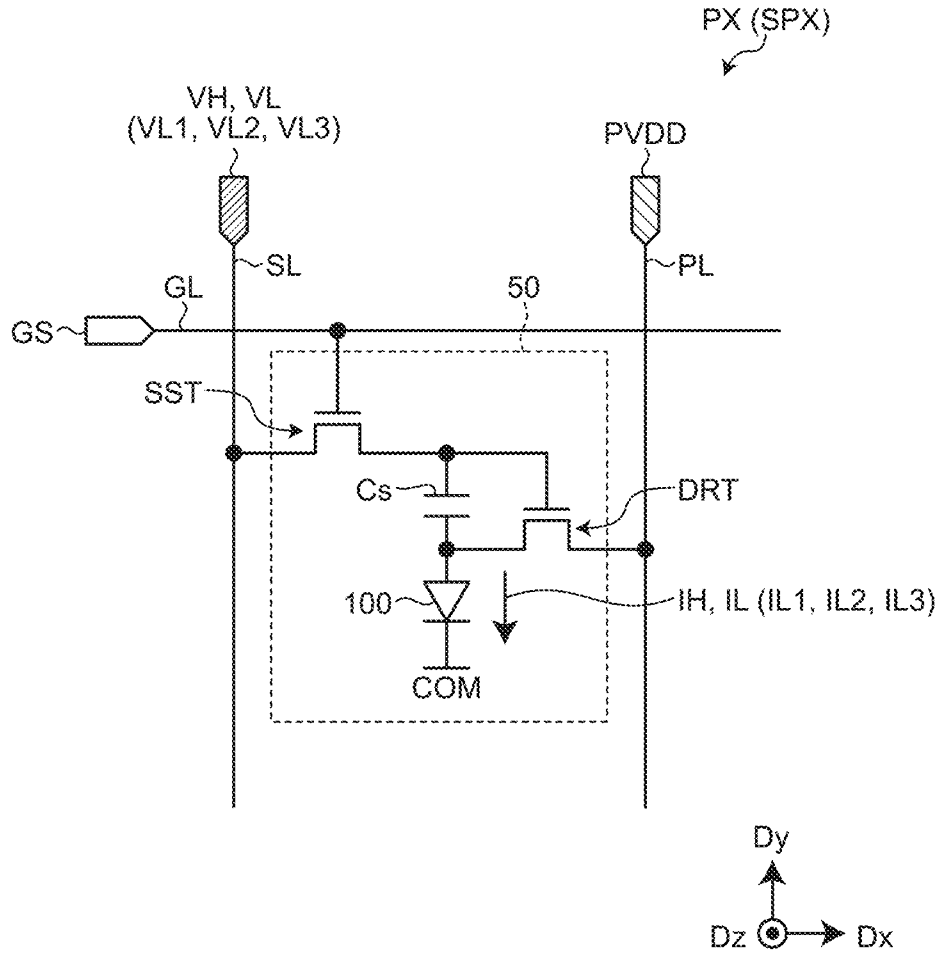
FIG. 4 is a circuit diagram of an exemplary configuration of a pixel circuit.

FIG. 4 is a circuit diagram of an exemplary configuration of the pixel circuit. As illustrated in FIG. 4, a pixel circuit 50 of the pixel PX includes the light-emitting element 100, a drive transistor DRT, a pixel transistor SST, and holding capacitance Cs.

The drive transistor DRT and the pixel transistor SST included in the pixel circuit 50 are each composed of an n-type thin-film transistor (TFT). The drive transistor DRT and the pixel transistor SST are provided to each of the light-emitting elements 100.

The gate of the drive transistor DRT is coupled to the output side of the pixel transistor SST. One of the source and the drain of the drive transistor DRT is coupled to the power supply line PL. The other of the source and the drain of the drive transistor DRT is coupled to the anode of the light-emitting element 100. The cathode of the light-emitting element 100 is supplied with reference voltage COM from the drive IC 210.

The gate of the pixel transistor SST is coupled to the scanning line GL. The gate of the pixel transistor SST is supplied with the gate drive signal GS. One of the source and the drain of the pixel transistor SST is coupled to the signal line SL. The other of the source and the drain of the pixel transistor SST is coupled to the gate of the drive transistor DRT. When the pixel transistor SST is turned on (coupled state), the gradation voltage (high level voltage VH and low level voltages VL1, VL2, and VL3) corresponding to the gradation value is supplied from the signal line drive circuit 13 to the gate of the drive transistor DRT. The gradation voltage includes four levels of different voltage signals, for example, and includes high level voltage VH and three low level voltages VL1, VL2, and VL3 set at lower voltage values than the high level voltage VH.

The ON state of the drive transistor DRT varies depending on the magnitude of the gradation voltage (high level voltage VH and low level voltages VL1, VL2, and VL3). If the high level voltage VH corresponds to a signal potential that provides the maximum luminance of the light-emitting element 100, for example, the drive transistor DRT is substantially completely turned on according to the potential of the high level voltage VH. As a result, an electric current (predetermined high level current IH) from the power supply voltage PVDD passes through the drive transistor DRT substantially without any change and is supplied to the light-emitting element 100.

By contrast, if the gradation voltage corresponds to a signal potential that provides the minimum luminance of the light-emitting element 100, that is, black, the drive transistor DRT is turned off, and the electric current from the power supply voltage PVDD is not supplied to the light-emitting element 100. If the low level voltages VL1, VL2, and VL3 correspond to signal potentials that provide intermediate luminance between the maximum luminance and the minimum luminance of the light-emitting element 100, the coupled state of the drive transistor DRT varies depending on the low level voltages VL1, VL2, and VL3, and low level currents IL1, IL2, and IL3 corresponding to the low level voltages VL1, VL2, and VL3, respectively, are supplied to the light-emitting element 100. In the following description, the low level voltages VL1, VL2, and VL3 may be simply referred to as low level voltages VL when they need not be distinguished from one another. The low level currents IL1, IL2, and IL3 may be simply referred to as low level currents IL when they need not be distinguished from one another.

As described above, the ON state of the drive transistor DRT varies by the magnitude corresponding to the potential of the gradation voltage. As a result, the electric current supplied from the power supply voltage PVDD to the light-emitting element 100 corresponds to the ON state of the drive transistor DRT. In other words, the selected light-emitting elements 100 are supplied with one of the high level current IH and the low level currents IL1, IL2, and IL3 corresponding to the gradation voltage (high level voltage VH and low level voltages VL1, VL2, and VL3).

The holding capacitance Cs included in the pixel circuit 50 is capacitance formed between the gate and the source of the drive transistor DRT. While the pixel circuit 50 illustrated in FIG. 4 includes two transistors (the drive transistor DRT and the pixel transistor SST), the configuration is not limited thereto. The pixel circuit 50 may include three or more transistors as needed.

Figure 5:
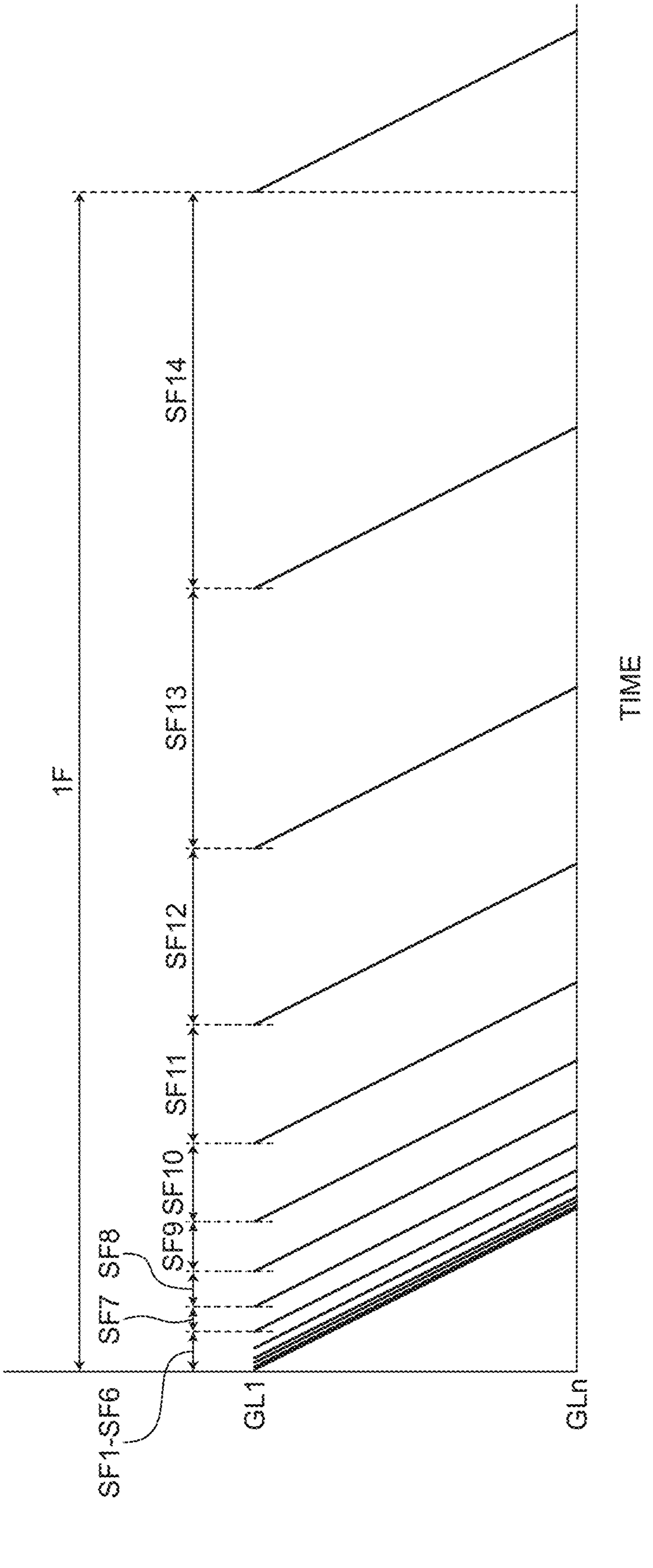
FIG. 5 is a timing chart for explaining a method for driving the display device according to the first embodiment.
Figure 6:
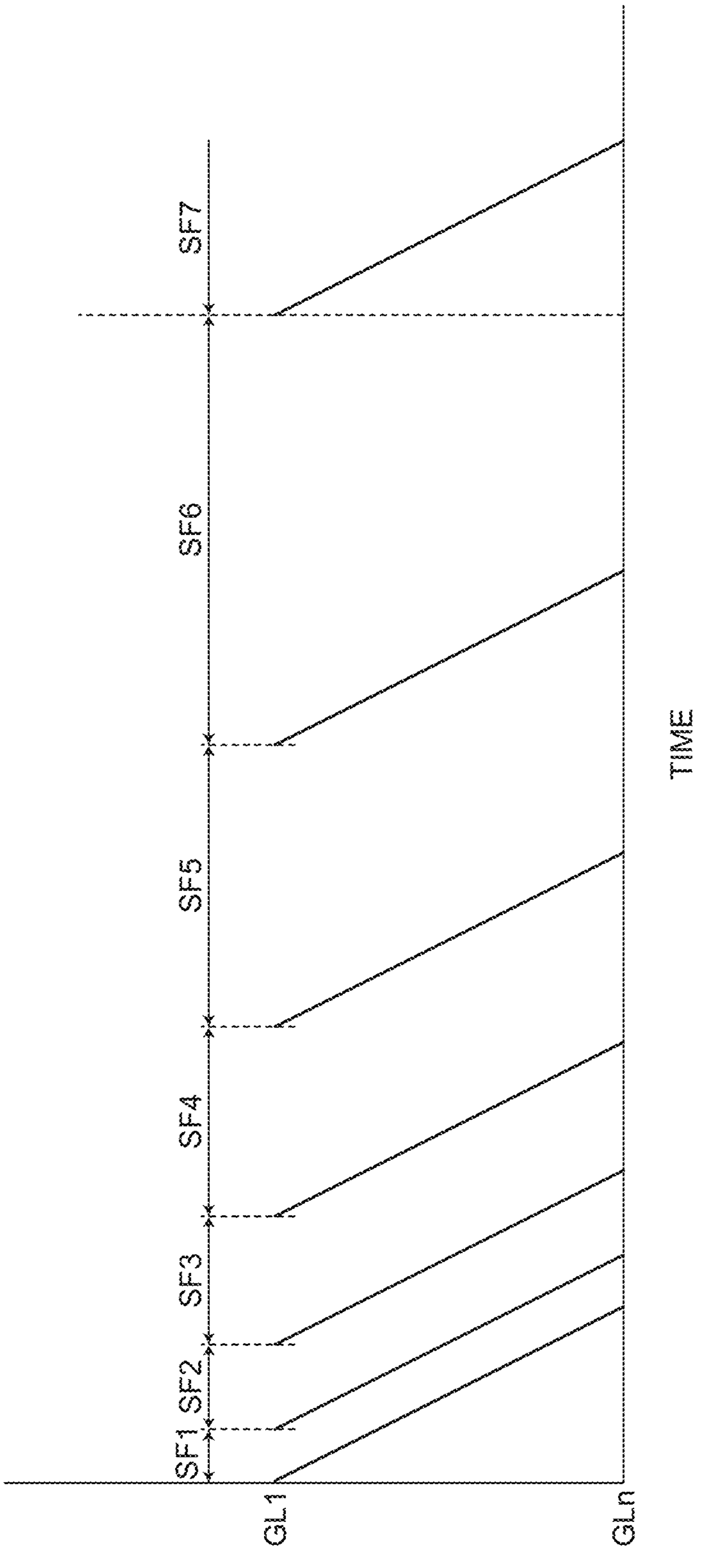
FIG. 6 is an enlarged timing chart of a subframe period SF1 to a subframe period SF6 in FIG. 5.

The following describes gradation control performed by the display device 1. FIG. 5 is a timing chart for explaining a method for driving the display device according to the first embodiment. FIG. 6 is an enlarged timing chart of a subframe period SF1 to a subframe period SF6 in FIG. 5.

As illustrated in FIGS. 5 and 6, the drive IC 210 (refer to FIG. 1) divides one frame period 1F into a plurality of subframe periods SF having different lengths and controls light emission and non-emission of the light-emitting elements 100 for each subframe period SF. One frame period 1F according to the present embodiment is divided into subframe periods SF1 to SF14 corresponding to 14-bit gradation values. By appropriately selecting light emission or non-emission for each subframe period SF in this manner, the light emission time differs in the entire frame period, and this difference in light emission time constitutes the gradation. In other words, a user recognizes the difference in light emission time of the pixel PX in the frame period as a change in gradation of the pixel PX based on the integral effect.

In the present embodiment, all the 14-bit subframe periods SF have different lengths. When the subframe period SF1 having the shortest length of the subframe periods SF is defined as a reference period, each of the subframe periods SF has a length obtained by multiplying the reference period (subframe period SF1) by $2^n$ (where n is a natural number). In other words, the subframe period SF14 has the longest length of the subframe periods SF. The subframe period SF13 has a length of one-half the length of the subframe period SF14. The subframe period SF12 has a length of one-half the length of the subframe period SF13. Thus, a low-order bit subframe period SF has a length of one-half the length of the adjacent high-order bit subframe period SF.

In each subframe period SF, the scanning line drive circuit 12 sequentially scans the first scanning line GL1 to the n-th scanning line GLn. The light-emitting elements 100 in the pixels PX in the selected pixel row are supplied with the electric current (one of the high level current IH and the low level currents IL1, IL2, and IL3) corresponding to the gradation voltage. The light-emitting elements 100 emit light with luminance corresponding to the length of the subframe period SF selected corresponding to the 14-bit gradation value and the electric current (one of the high level current IH and the low level current IL1, IL2, and IL3) corresponding to the gradation voltage.

More specifically, in the range of the gradation values larger than a predetermined gradation value (high gradation side), the electric current supplied to the light-emitting elements 100 is kept constant at the high level current IH to control light emission (on) and non-emission (off) of the light-emitting elements 100 for each subframe period SF by the operations of the scanning line drive circuit 12 and the signal line drive circuit 13. In the range of the gradation values equal to or smaller than the predetermined gradation value (low gradation side), one current value out of the low level currents IL1, IL2, and IL3 is used as the electric current supplied to the light-emitting element 100 to control light emission (on) and non-emission (off) of the light-emitting elements 100 for each subframe period SF.

As described above, the display device 1 can perform multi-gradation display by combining the following two systems: a system that expresses the gradation by controlling the value of the electric current supplied to the light-emitting elements 100 of the pixels PX (sub-pixels SPX) (hereinafter referred to as a current drive system) and a system that expresses the gradation by controlling the light emission time while keeping the value of the electric current supplied to the light-emitting elements 100 constant (hereinafter referred to as a PWM drive system or a pulse width modulation system). The display device 1 controls light emission and non-emission of the light-emitting elements 100 for each subframe period SF corresponding to the 14-bit gradation values. Therefore, the display device 1 can match the relation between the gradation value and the luminance with a desired gamma curve (e.g., a gamma curve corresponding to a gamma value of 2.2).

Figure 7:
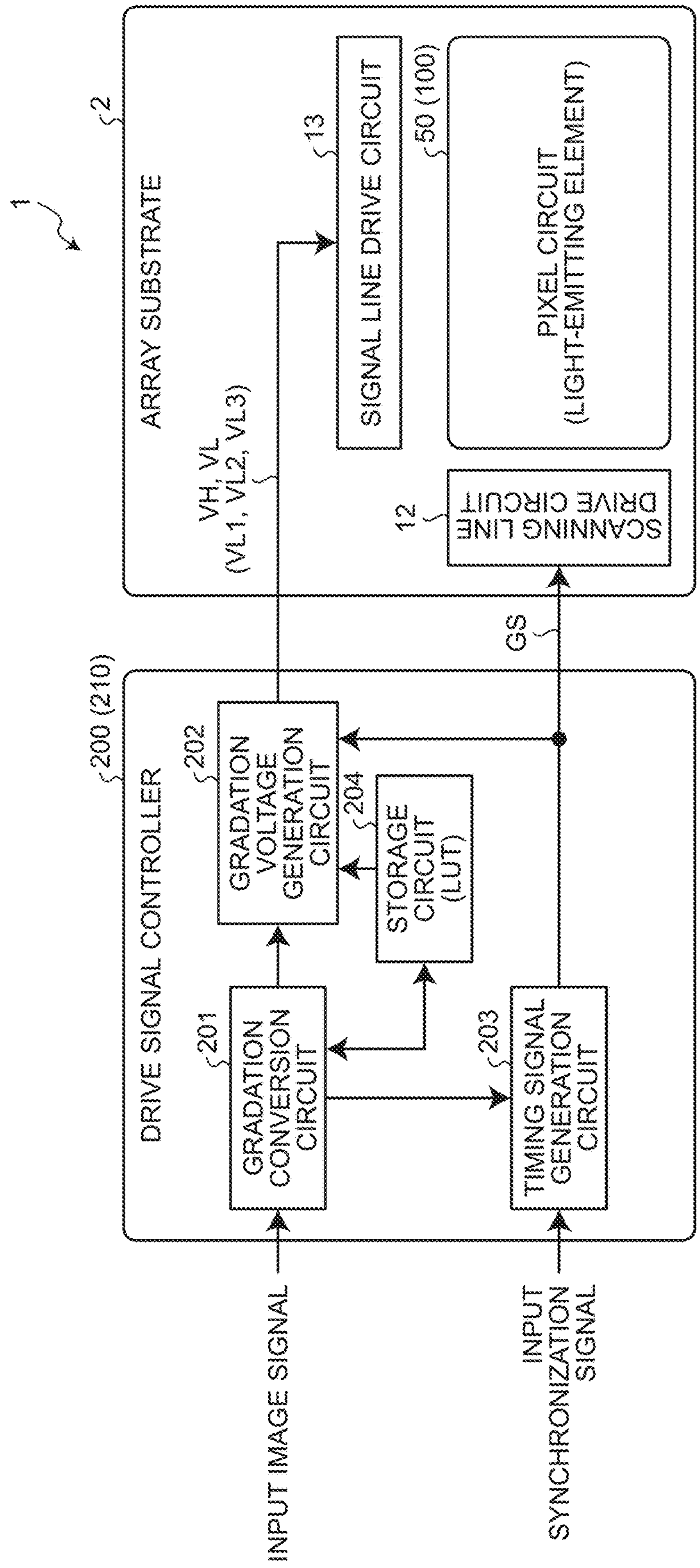
FIG. 7 is a block diagram of an exemplary configuration of the display device according to the first embodiment.

FIG. 7 is a block diagram of an exemplary configuration of the display device according to the first embodiment. As illustrated in FIG. 7, the display device 1 includes the pixel circuit 50 and a drive signal controller 200 that controls the drive of the pixel circuit 50. The pixel circuit 50 is a circuit that supplies drive signals (electric current) to the light-emitting element 100 to drive the light-emitting element 100. While one pixel circuit 50 (light-emitting element 100) is schematically illustrated in FIG. 7, a plurality of pixel circuits 50 and a plurality of light-emitting elements 100 are provided to the respective sub-pixels SPX (refer to FIG. 2).

The drive signal controller 200 includes a gradation conversion circuit 201, a gradation voltage generation circuit 202, a timing signal generation circuit 203, and a storage circuit 204. The gradation conversion circuit 201 is a circuit that converts 8-bit image signals input from an external control circuit into 14-bit gradation values for each pixel PX (sub-pixel SPX). The storage circuit 204 is a circuit that stores therein the relation between the 8-bit image signals and the 14-bit gradation values in a look-up table (LUT). The gradation conversion circuit 201 determines the 14-bit gradation values based on the LUT from the storage circuit 204.

The gradation voltage generation circuit 202 is a circuit that generates the high level voltage VH and the low level voltages VL1, VL2, and VL3 and outputs one of the high level voltage VH and the low level voltages VL1, VL2, and VL3 as the gradation voltage based on the 14-bit gradation values (target luminance level) received from the gradation conversion circuit 201. The storage circuit 204 stores therein in advance the relation between the 14-bit gradation values (target luminance level) and the value of the electric current supplied to the light-emitting elements 100 (refer to FIGS. 24 and 25). The gradation voltage generation circuit 202 outputs the gradation voltage (high level voltage VH and low level voltages VL1, VL2, and VL3) based on information from the storage circuit 204.

The timing signal generation circuit 203 generates timing signals based on synchronization signals input from the external control circuit and the 14-bit gradation values received from the gradation conversion circuit 201. The scanning line drive circuit 12 outputs the gate drive signals GS corresponding to each subframe period SF to the pixel circuit 50 based on the timing signals (control signals) supplied from the timing signal generation circuit 203. The gradation voltage generation circuit 202 operates in synchronization with the scanning line drive circuit 12 based on the timing signals (control signals) supplied from the timing signal generation circuit 203 and outputs the gradation voltage corresponding to the 14-bit gradation values to the signal line drive circuit 13 for each selected subframe period SF.

With this configuration, the display device 1 can perform multi-gradation display by combining the current drive system and the PWM drive system described above. The drive signal controller 200 may be formed integrally with the drive IC 210 or may be provided to the external control circuit as a circuit different from the drive IC 210.

Figure 8:
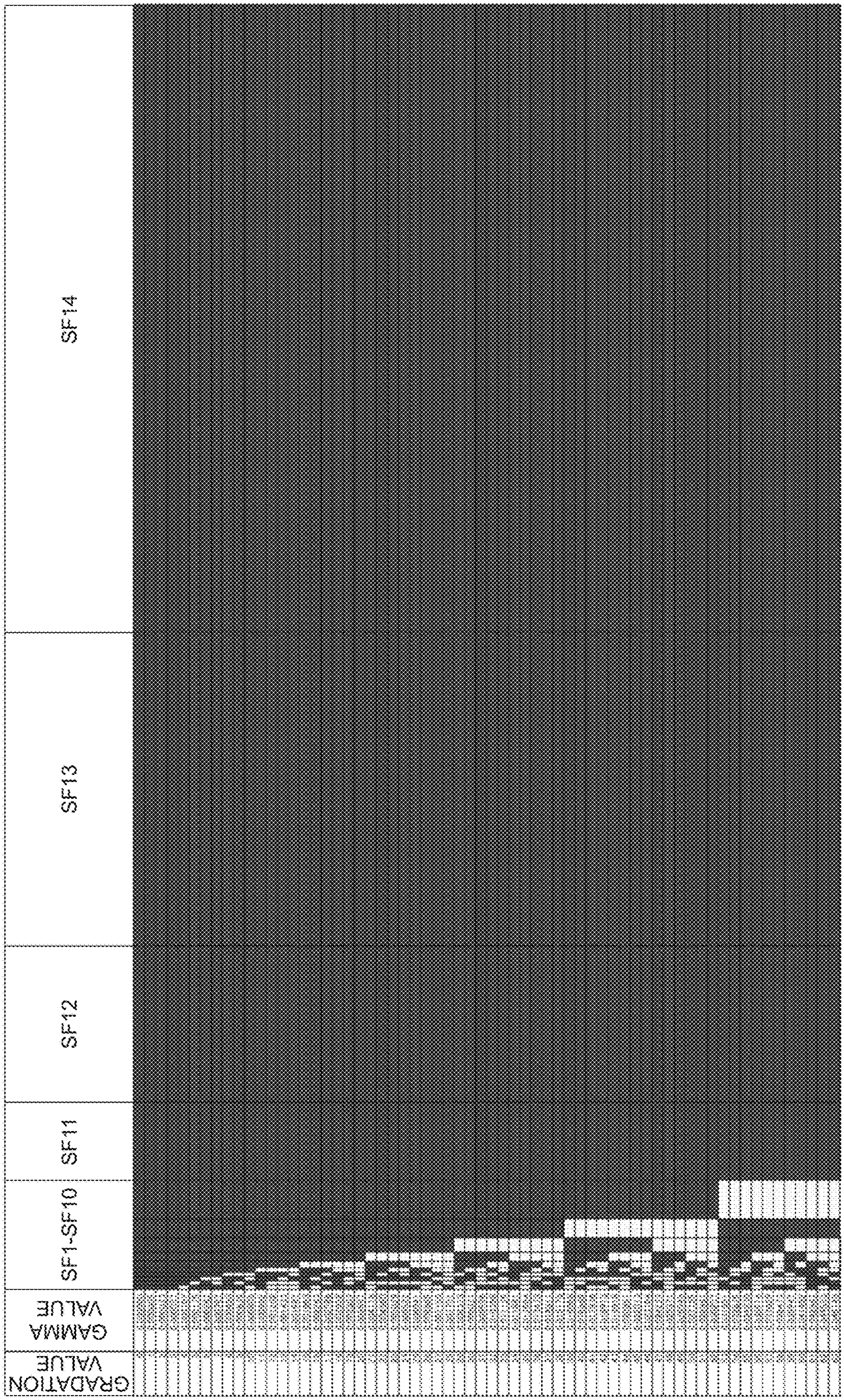
FIG. 8 is a diagram for explaining a light emission sequence for each gradation value (gradation value 0 to gradation value 63) of the display device according to the first embodiment.
Figure 9:
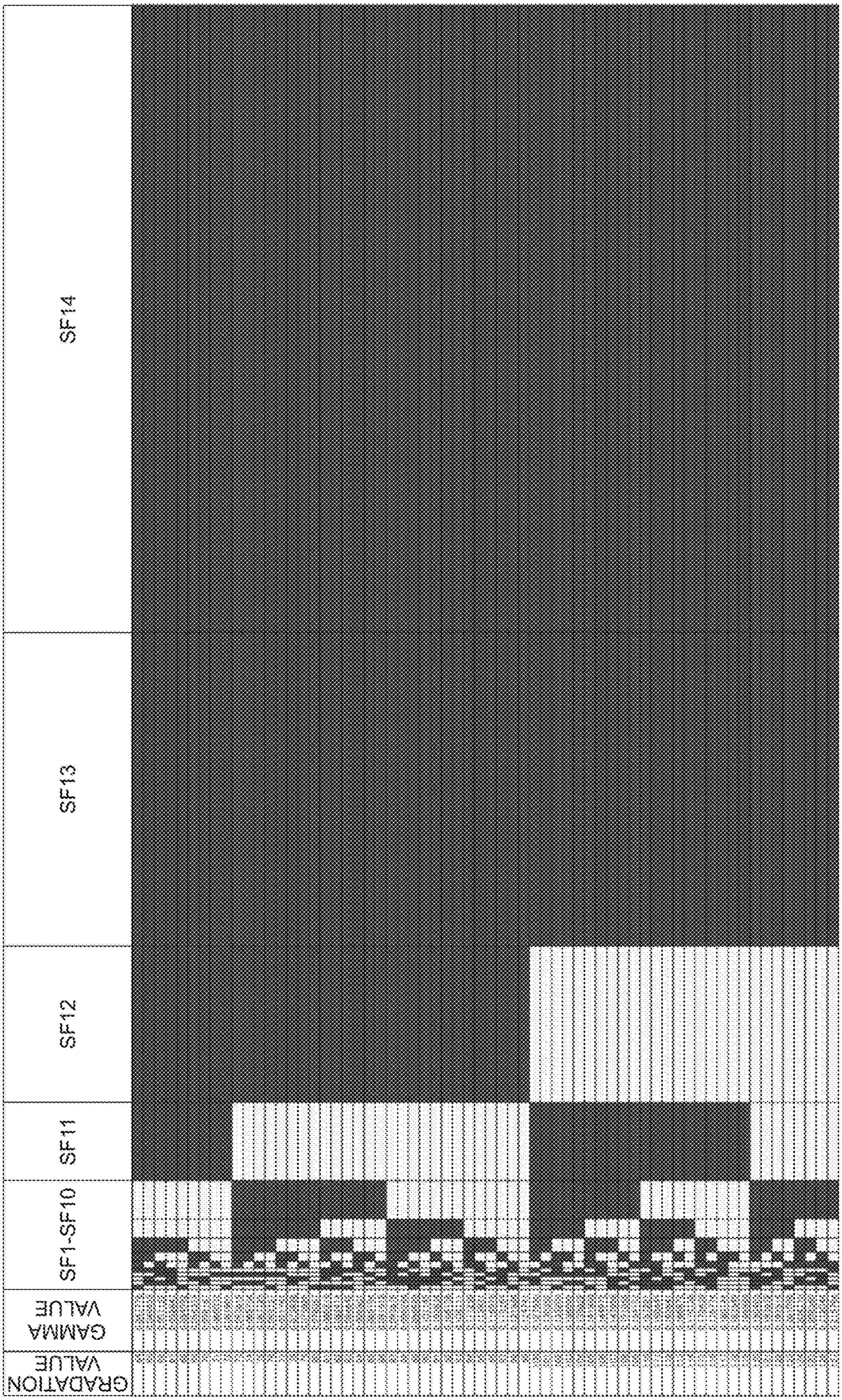
FIG. 9 is a diagram for explaining the light emission sequence for each gradation value (gradation value 64 to gradation value 127) of the display device according to the first embodiment.
Figure 10:
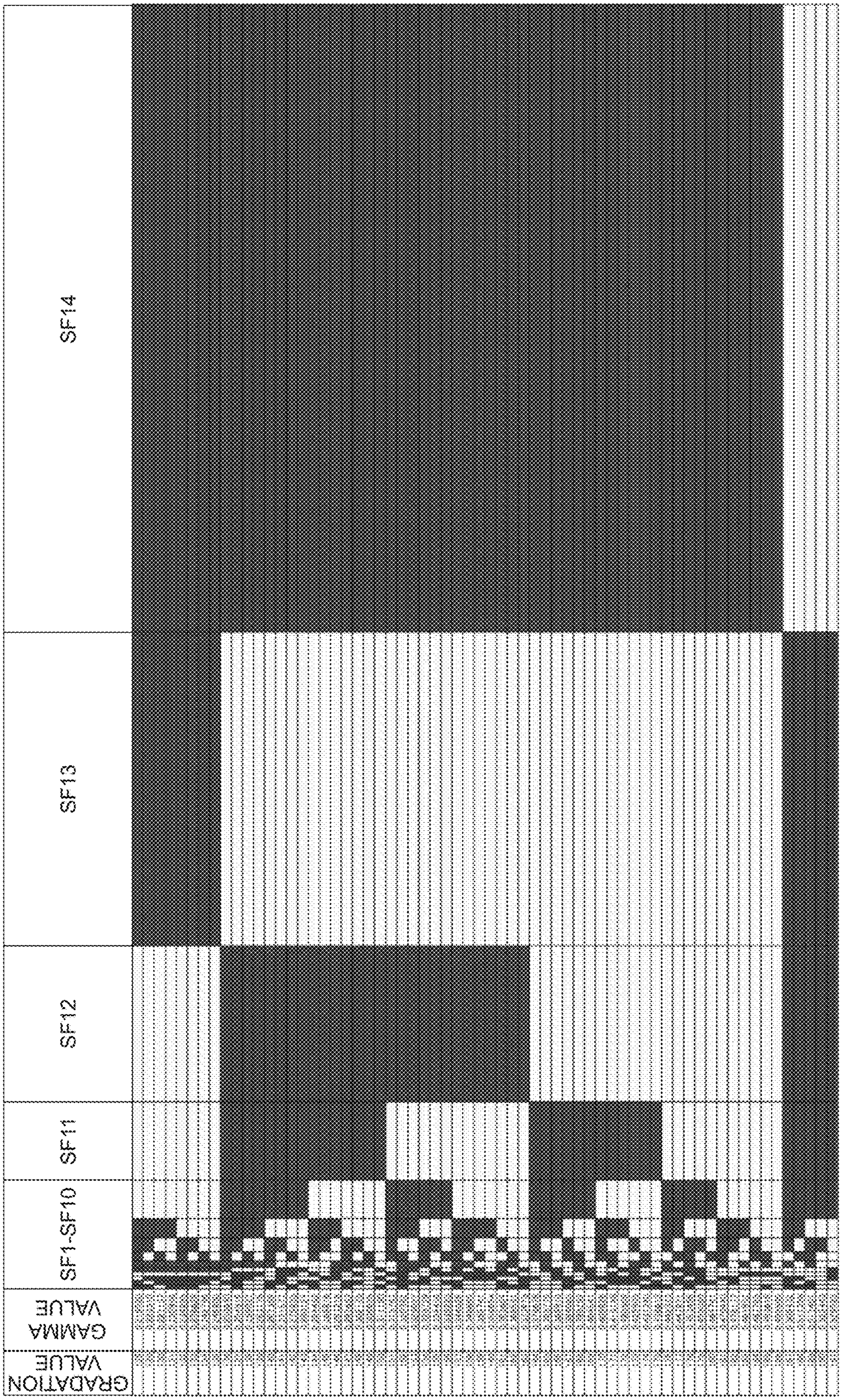
FIG. 10 is a diagram for explaining the light emission sequence for each gradation value (gradation value 128 to gradation value 191) of the display device according to the first embodiment.
Figure 11:
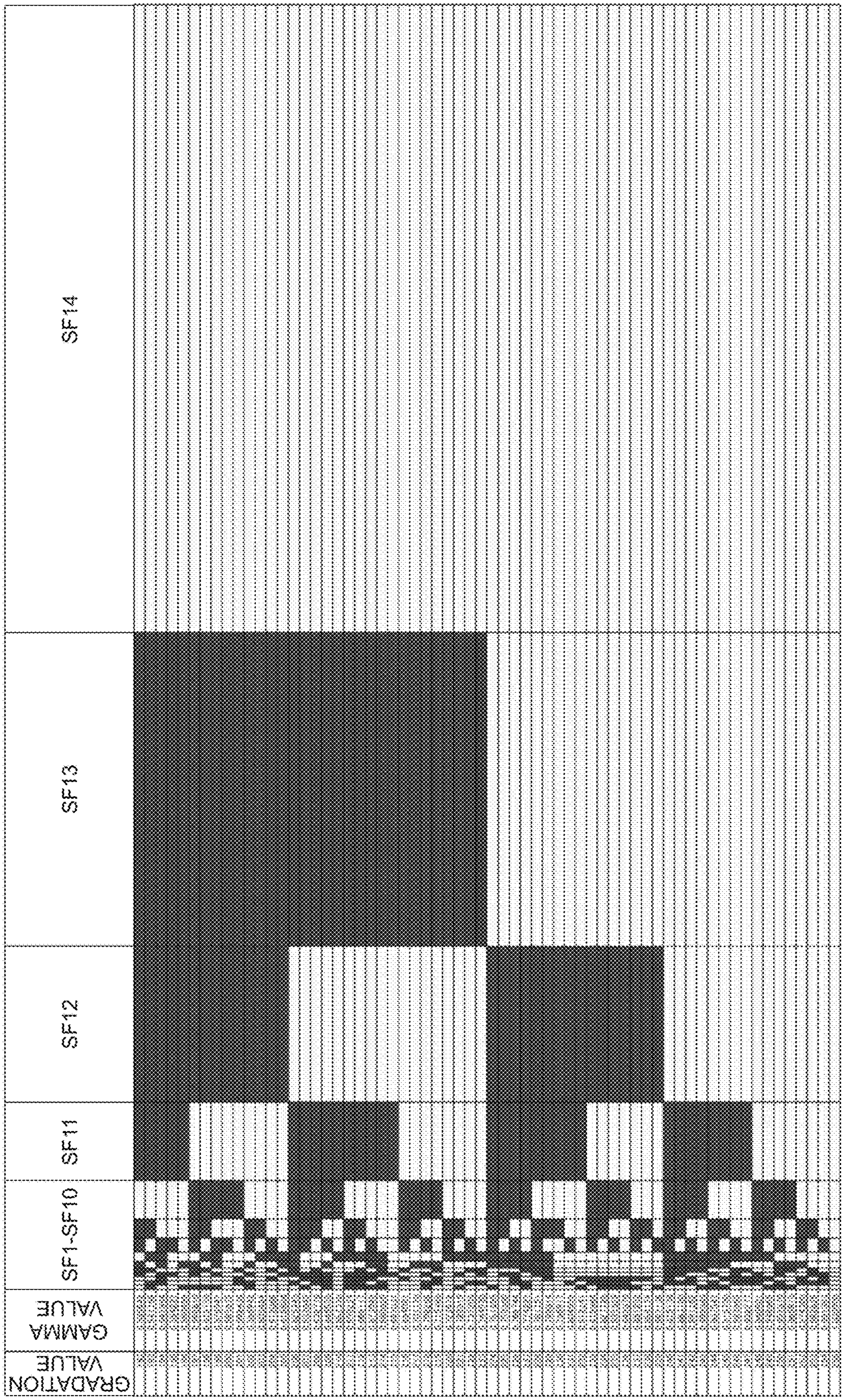
FIG. 11 is a diagram for explaining the light emission sequence for each gradation value (gradation value 192 to gradation value 255) of the display device according to the first embodiment.

The following describes an example of the method for controlling light emission and non-emission of a plurality of light-emitting elements 100 for each subframe period SF in the display device 1 according to the present embodiment. FIG. 8 is a diagram for explaining a light emission sequence for each gradation value (gradation value 0 to gradation value 63) of the display device according to the first embodiment. FIG. 9 is a diagram for explaining a light emission sequence for each gradation value (gradation value 64 to gradation value 127) of the display device according to the first embodiment. FIG. 10 is a diagram for explaining a light emission sequence for each gradation value (gradation value 128 to gradation value 191) of the display device according to the first embodiment. FIG. 11 is a diagram for explaining a light emission sequence for each gradation value (gradation value 192 to gradation value 255) of the display device according to the first embodiment. FIG. 12 is an enlarged diagram for explaining gradation value 192 to gradation value 223 in FIG. 11. FIG. 13 is an enlarged diagram for explaining gradation value 224 to gradation value 255 in FIG. 11. FIG. 14 is a diagram for explaining an example of a light emission sequence for each gradation value (gradation value 0 to gradation value 16) of the display device according to the first embodiment.

FIGS. 8 to 14 illustrate the gamma values and light emission/non-emission of the light-emitting elements 100 for each subframe period SF corresponding to respective 256 gradation values (gradation value 0 to gradation value 255). The gamma value in FIGS. 8 to 14 indicates the normalized luminance of the gamma curve corresponding to a gamma value of 2.2. In FIG. 8, for example, in the subframe periods SF1 to SF14, light emission periods in which the light-emitting elements 100 emit light are represented in white, and non-emission periods in which the light-emitting elements 100 do not emit light are represented in black. The width of each subframe period SF is schematically illustrated corresponding to the length of the subframe period SF. In other words, a larger width of each subframe period SF indicates a longer light emission (or non-emission) period of the light-emitting elements 100; and a smaller width of each subframe period SF indicates a shorter light emission (or non-emission) period of the light-emitting elements 100.

FIG. 14 also illustrates the current values (mA) of the electric current supplied to the light-emitting elements 100 in each subframe period SF. In FIG. 14, for example, when the gradation value is 1 and the subframe period is SF1, the current value supplied to the light-emitting elements 100 is 0.033 mA. Further, when the gradation value is 5 and the subframe period is SF4, the current value supplied to the light-emitting elements 100 is 0.33 mA. While the subframe periods SF7 to SF14 are not illustrated in FIG. 14, all of the subframe periods SF7 to SF14 are the non-emission periods (refer to FIG. 8) in the range of the gradation values illustrated in FIG. 14. FIG. 14 can be said a modification regarding the subframe periods SF1 to SF6 when the gradation value 0 to gradation value 16 illustrated in FIG. 8 are displayed.

As illustrated in FIG. 14, the current value of the high level current IH is set to 1.0 mA. The current value of the low level current IL1 is set to 0.33 mA. The current value of the low level current IL2 is set to 0.1 mA. The current value of the low level current IL3 is set to 0.033 mA. As described above, the current values of the low level currents IL1, IL2, and IL3 according to the present embodiment are set to values obtained by multiplying the current value of the high level current IH by $(1/3)^n$ (where n is 1, 2, or 3), for example.

As illustrated in FIG. 14, at the gradation value 0, the light-emitting elements 100 do not emit light in all the subframe periods SF, and the lowest luminance (i.e., black) of the pixel PX is displayed. At the gradation value 1, the low level current IL3 (current value of 0.033 mA) is used, and the light-emitting elements 100 emit light in the subframe periods SF1 and SF2 (light emission periods) and do not emit light in the subframe periods SF3 to SF14 (non-emission periods).

At the gradation value 2, the low level current IL2 (current value of 0.1 mA) is used, and the light-emitting element 100 emits light in the subframe periods SF1 and SF2 (light emission periods) and do not emit light in the subframe periods SF3 to SF14 (non-emission periods).

At the gradation values 3 to 5, the low level current IL1 (current value 0.33 mA) is used. At the gradation value 3, the light-emitting elements 100 emit light in the subframe periods SF1 and SF2 (light emission periods) and do not emit light in the subframe periods SF3 to SF14 (non-emission periods). At the gradation value 4, the light-emitting elements 100 emit light in the subframe periods SF2 and SF3 (light emission periods) and do not emit light in the subframe period SF1 and the subframe periods SF4 to SF14 (non-emission periods). At the gradation value 5, the light-emitting elements 100 emit light in the subframe period SF4 (light emission period) and do not emit light in the subframe periods SF1, SF2, and SF3 and the subframe periods SF5 to SF14 (non-emission periods).

At the gradation value 6 or larger, the fixed high level current IH (current value of 1.0 mA) is used as the electric current supplied to the light-emitting elements 100. At the gradation value 6, the light-emitting elements 100 emit light in the subframe period SF3 (light emission period) and do not emit light in the subframe periods SF1 and SF2 and the subframe periods SF4 to SF14 (non-emission periods). At the gradation value 7, the light-emitting elements 100 emit light in the subframe periods SF2 and SF3 (light emission periods) and do not emit light in the subframe period SF1 and the subframe periods SF4 to SF14 (non-emission periods). In the same manner, light emission and non-emission of the light-emitting elements 100 are controlled such that the total length of the subframe periods SF serving as the light emission periods becomes longer as the gradation value becomes larger.

As illustrated in FIGS. 8 to 13, in the range of the gradation values 6 to 72, light emission/non-emission of the light-emitting elements 100 is switched for each gradation value in the subframe periods SF1 to SF10. In the subframe periods SF11 to SF14, the light-emitting elements 100 do not emit light.

In the range of the gradation values 73 to 99, light emission/non-emission of the light-emitting elements 100 is switched for each gradation value in the subframe periods SF1 to SF10. In the range of the gradation values 73 to 99, the light-emitting elements 100 emit light in the subframe period SF11. In the subframe periods SF12 to SF14, the light-emitting elements 100 do not emit light.

In the range of the gradation values 100 to 135, light emission/non-emission of the light-emitting elements 100 is switched for each gradation value in the subframe periods SF1 to SF11. In the range of the gradation values 100 to 135, the light-emitting elements 100 emit light in the subframe period SF12. In the subframe periods SF13 and SF14, the light-emitting elements 100 do not emit light.

In the range of the gradation values 136 to 186, light emission/non-emission of the light-emitting elements 100 is switched for each gradation value in the subframe periods SF1 to SF12. In the range of the gradation values 136 to 186, the light-emitting elements 100 emit light in the subframe period SF13. In the subframe period SF14, the light-emitting elements 100 do not emit light.

In the range of the gradation values 187 to 255, light emission/non-emission of the light-emitting elements 100 is switched for each gradation value in the subframe periods SF1 to SF13. In the range of the gradation values 187 to 255, the light-emitting elements 100 emit light in the subframe period SF14. At the gradation value 255, the light-emitting elements 100 emit light in all the subframe periods SF, and the highest luminance of the pixel PX is displayed.

Figure 15:
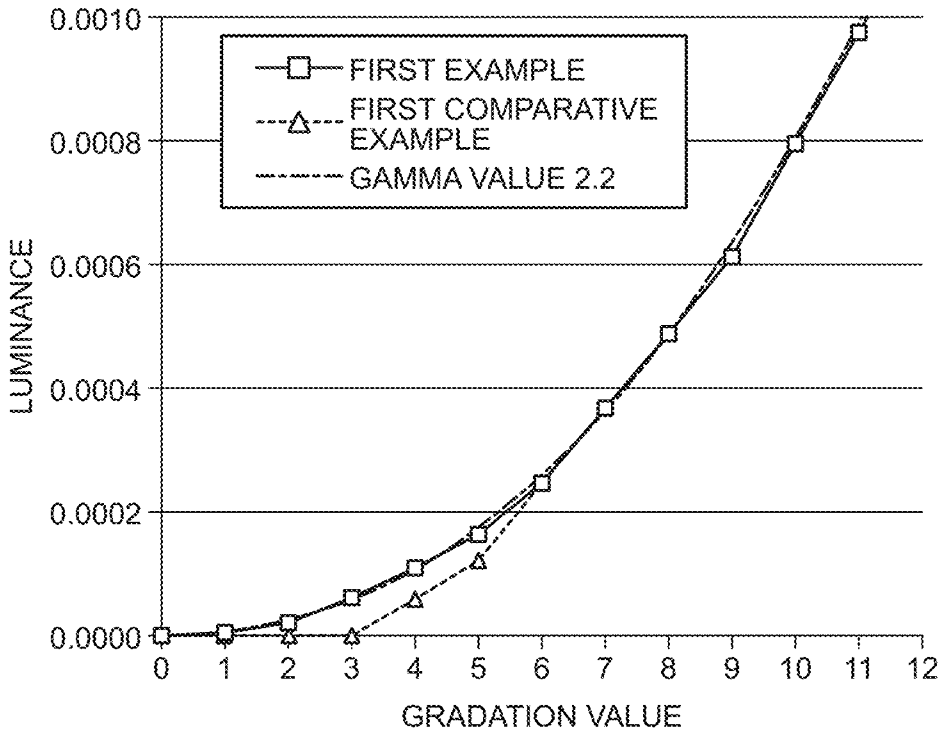
FIG. 15 is a graph of the relation between the gradation value and the luminance of the pixel of the display device according to a first example.

FIG. 15 is a graph of the relation between the gradation value and the luminance of the pixel of the display device according to a first example. FIG. 15 illustrates the simulation results of luminance of the display device according to the first example that performs multi-gradation display by combining the current drive system and the PWM drive system according to the light emission sequence illustrated in FIGS. 8 to 14. FIG. 15 also illustrates the simulation results of the display device according to a first comparative example that does not employ the method of combining the current drive system with the PWM drive system on the low gradation side and performs multi-gradation display by the PWM drive system by fixing the electric current supplied to the light-emitting elements 100 to the high level current IH (current value of 1.0 mA) at any gradation. FIG. 15 illustrates the gamma curve with a gamma value of 2.2.

As illustrated in FIG. 15, the luminance value according to the first comparative example that performs multi-gradation display only by the PWM drive system satisfactorily matches the gamma curve with a gamma value of 2.2 on the high gradation side (gradation value 6 or larger). The luminance value, however, has errors with respect to the gamma curve with a gamma value of 2.2. on the low gradation side (gradation value 5 or smaller).

By contrast, it is found out that the luminance of the first example that performs multi-gradation display by combining the current drive system and the PWM drive system satisfactorily matches the gamma curve with a gamma value of 2.2 in the range of all the gradation values from the low gradation side (gradation value 5 or smaller) to the high gradation side (gradation value 6 or larger).

As described above, the display device 1 according to the present embodiment has a first display drive system (PWM drive system) and a second display drive system (combination of the current drive system and the PWM drive system) as the system for driving a plurality of light-emitting elements 100. The first display drive system supplies the fixed high level current IH to the light-emitting elements 100 and changes the length of the light emission period in which the light-emitting elements 100 emit light on the high gradation side (e.g., the gradation value 6 or larger). The second display drive system supplies one low level current IL selected from the low level currents IL1, IL2, and IL3 each having a current value smaller than that of the high level current IH and set to different current values to the light-emitting elements 100 and changes the length of the light emission period in which the light-emitting elements 100 emit light on the low gradation side (e.g., the gradation value 5 or smaller). It can be considered that the second display drive system does not use the PWM drive system and the current drive system in a time-division manner but employs the PWM drive system in all the subframe periods SF while using a selected current value instead of the fixed current value for some of the subframe periods SF. In view of this point, the second display drive system can be considered to incorporate (integrate) the current drive system into the PWM drive system.

Therefore, the display device 1 according to the present embodiment can accurately adjust the luminance of the light-emitting elements 100 and satisfactorily perform gradation control on the low gradation side by gradation display by combining the current drive system and the PWM drive system.

More specifically, in the current drive system, the current values of the low level currents IL1, IL2, and IL3 are set to values obtained by multiplying the current value of the high level current IH by $(1/3)^n$ (where n is 1, 2, or 3). The length of the subframe periods SF is set to a power of 2. In other words, the subframe period SF is set by multiplying the reference period (subframe period SF1) by $2^n$ (where n is a natural number) as described above. Therefore, the display device 1 has a larger number of expressible gradations and can accurately control the luminance of the light-emitting elements 100 by combining the current drive system using the low level currents IL and the PWM drive system that switches light emission/non-emission in the subframe periods SF. The luminance, particularly on the low gradation side, can be satisfactorily matched with the gamma curve with a gamma value of 2.2.

The display device 1 can satisfactorily match the luminance on the high gradation side with the gamma curve with a gamma value of 2.2 by dividing one frame period 1F into 14-bit subframe periods SF and employing the PWM drive system.

As illustrated in FIG. 14, the low level currents IL1, IL2, and IL3 having three levels of different current values are set in the second display drive system (combination of the current drive system and the PWM drive system). In a plurality of subframe periods SF corresponding to one gradation value, the low level current IL having the same current value is supplied to the light-emitting elements 100. At one gradation value 2, for example, the low level current IL3 having the same current value of 0.033 mA is supplied to the light-emitting elements 100 in the subframe periods SF1 and SF2. The same applies to the gradation values 2 to 5, which are not described in detail.

Therefore, if the luminance of the light-emitting elements 100 varies depending on the supplied current value in the luminance characteristics indicating the relation between the luminance of the light-emitting elements 100 and the current value, the display device 1 can suppress errors in luminance of the light-emitting elements 100 because the low level current IL having the same current value is supplied at the same gradation value.

While the subframe periods SF1 to SF14 are arranged in this order on the time axis in FIGS. 5 and 6, the order is not limited thereto. The subframe periods SF1 to SF14 may be arranged in any order. The relation between the lengths of the subframe periods SF can also be appropriately changed.

The light emission sequence for each subframe period SF illustrated in FIGS. 8 to 14 is given by way of example only, and the light emission sequence is not limited thereto. The light emission sequence can be appropriately set according to the conditions, such as the length of each subframe period SF, the current values of the high level current IH and the low level currents IL1, IL2, and IL3, and the gradation value (target luminance level). As long as the desired luminance can be obtained in one frame period 1F, the combination (light emission sequence) of the pattern of light emission/non-emission in each subframe period SF and the current values (the high level current IH and the low level currents IL1, IL2, and IL3) supplied to the light-emitting elements 100 may be different from those in FIGS. 8 to 14. The combination of the pattern of light emission/non-emission for each subframe period SF and the current value supplied to the light-emitting elements 100 will be described later with reference to FIGS. 24 and 25.

The current values of the low level currents IL1, IL2, and IL3 illustrated in FIG. 14 are given by way of example only and can be appropriately changed. While the three levels of low level currents IL1, IL2, and IL3 according to the present embodiment are set in advance, the present embodiment is not limited thereto. Alternatively, two levels of low level currents or four or more levels of low level currents may be set as the electric current supplied to the light-emitting elements 100 on the low gradation side.

While the current values of the low level currents IL1, IL2, and IL3 are values obtained by multiplying the current value of the high level current IH by $(1/3)^n$ (where n is 1, 2, or 3), the present embodiment is not limited thereto. For example, the current values of the low level currents IL1, IL2, and IL3 may be values obtained by multiplying the current value of the high level current IH by $(1/2)^n$. In this case, the current values of the low level currents IL1, IL2, and IL3 are set to 0.5 mA, 0.25 mA, and 0.125 mA, respectively, with respect to the high level current IH (current value of 1.0 mA).

First Modification of the First Embodiment

Figure 16:
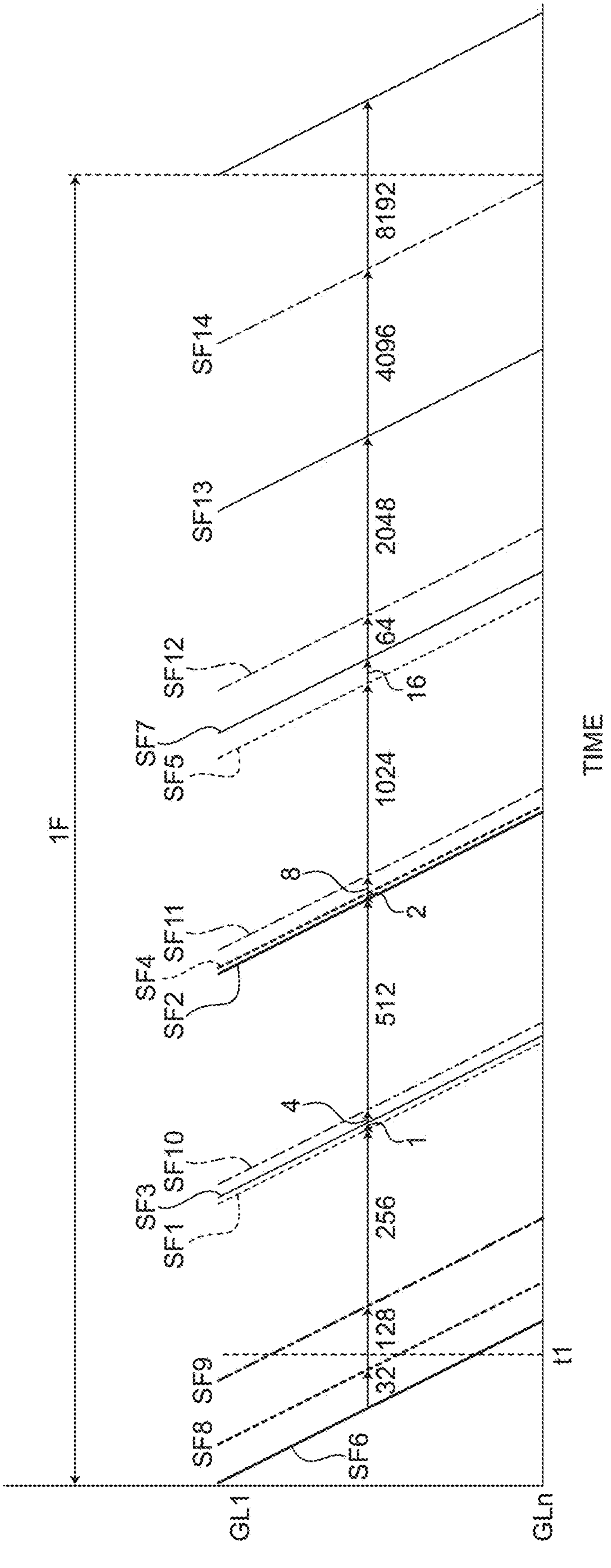
FIG. 16 is a timing chart for explaining the method for driving the display device according to a first modification of the first embodiment.

FIG. 16 is a timing chart for explaining the method for driving the display device according to a first modification of the first embodiment. As illustrated in FIG. 16, in the display device 1 according to the first modification of the first embodiment, the subframe periods SF6, SF8, SF9, SF1, SF3, SF10, SF2, SF4, SF11, SF5, SF7, SF12, SF13, and SF14 are arranged in this order on the time axis in one frame period 1F. The length of the subframe period SF in FIG. 16 (e.g., a length of 32 of the subframe period SF6) is schematically illustrated to facilitate understanding.

The following describes a plurality of subframe periods SF by dividing them into a plurality of high-order bit subframe periods SF set to a length equal to or longer than a predetermined period and a plurality of low-order bit subframe periods SF set to a length shorter than the predetermined period. The high-order bit subframe periods SF are subframe periods SF9 to SF14, for example. The low-order bit subframe periods SF are subframe periods SF1 to SF8, for example.

In the present modification, the high-order bit subframe period SF and the low-order bit subframe periods SF are alternately arranged. Specifically, the low-order bit subframe periods SF6 and SF8 and the high-order bit subframe period SF9 are adjacently arranged. Subsequently, the low-order bit subframe periods SF1 and SF3 and the high-order bit subframe period SF10 are adjacently arranged. The two low-order bit subframe periods SF1 and SF3 are arranged between the high-order bit subframe periods SF9 and SF10.

In the same manner, the low-order bit subframe periods SF2 and SF4 and the high-order bit subframe period SF11 are adjacently arranged. The two low-order bit subframe periods SF2 and SF4 are arranged between the high-order bit subframe periods SF10 and SF11. Next, the low-order bit subframe periods SF5 and SF7 and the high-order bit subframe period SF12 are adjacently arranged. The two low-order bit subframe periods SF5 and SF7 are arranged between the high-order bit subframe periods SF11 and SF12.

As described above, a plurality of low-order bit subframe periods SF having a relatively short length are arranged between the high-order bit subframe periods SF having a long length. As a result, the number of scanning lines GL selected at the same timing (e.g., time t1) is reduced to three. Therefore, the configuration of the scanning line drive circuit 12 can be simplified compared with the case where the subframe periods SF1 to SF14 are arranged in this order.

While two low-order bit subframe periods SF are arranged adjacently to one high-order bit subframe period SF in FIG. 16, the arrangement is not limited thereto. One low-order bit subframe period SF may be arranged adjacently to one high-order bit subframe period SF. The arrangement of the subframe periods SF illustrated in FIG. 16 is given by way of example only and can be appropriately changed.

Second Embodiment

Figure 17:
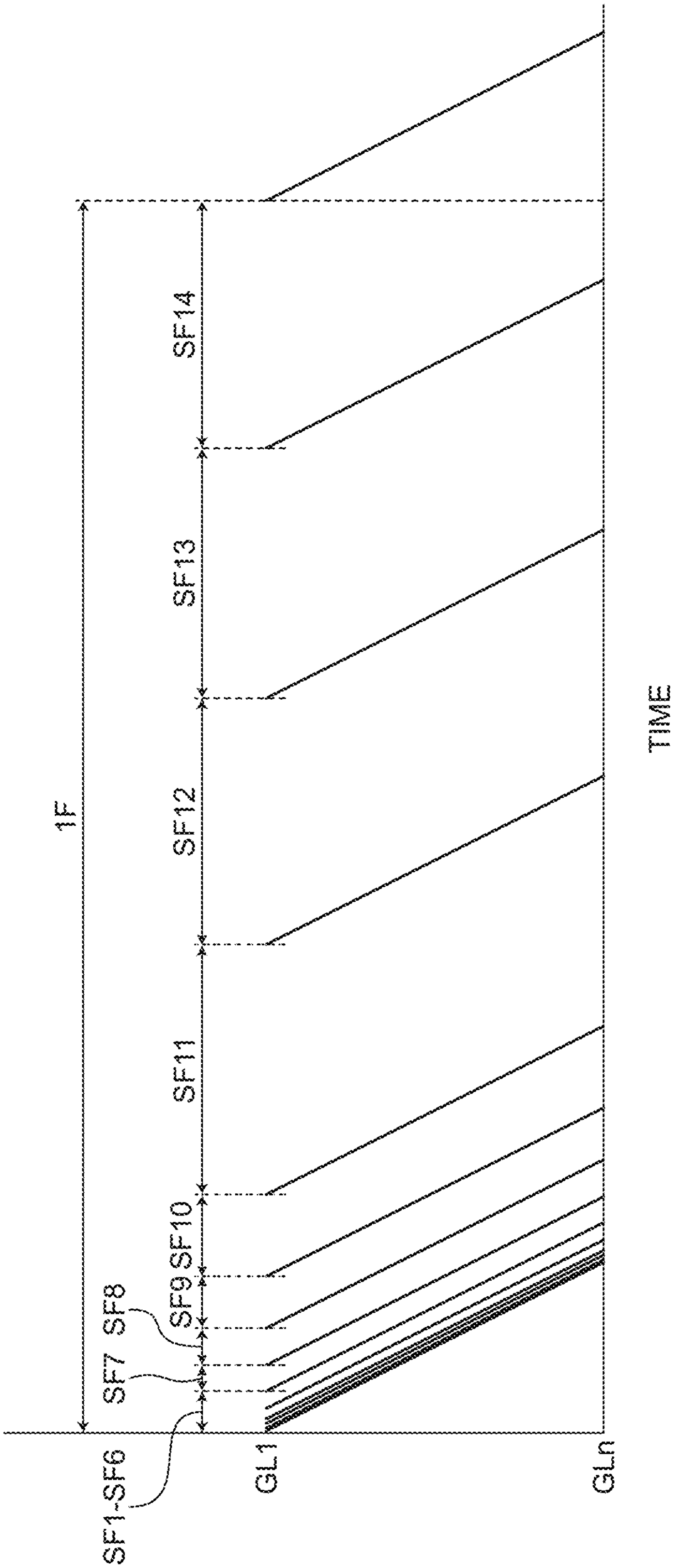
FIG. 17 is a timing chart for explaining the method for driving the display device according to a second embodiment.

FIG. 17 is a timing chart for explaining the method for driving the display device according to a second embodiment. As illustrated in FIG. 17, in the display device 1 according to the second embodiment, a plurality of high-order bit subframe periods SF11, SF12, SF13, and SF14 out of the 14-bit subframe periods SF have the same length, and a plurality of low-order bit subframe periods SF1 to SF10 have different lengths. In the second embodiment, the number of gradations that can be displayed in the subframe periods SF1 to SF14 corresponds to 12 bits.

Figure 18:
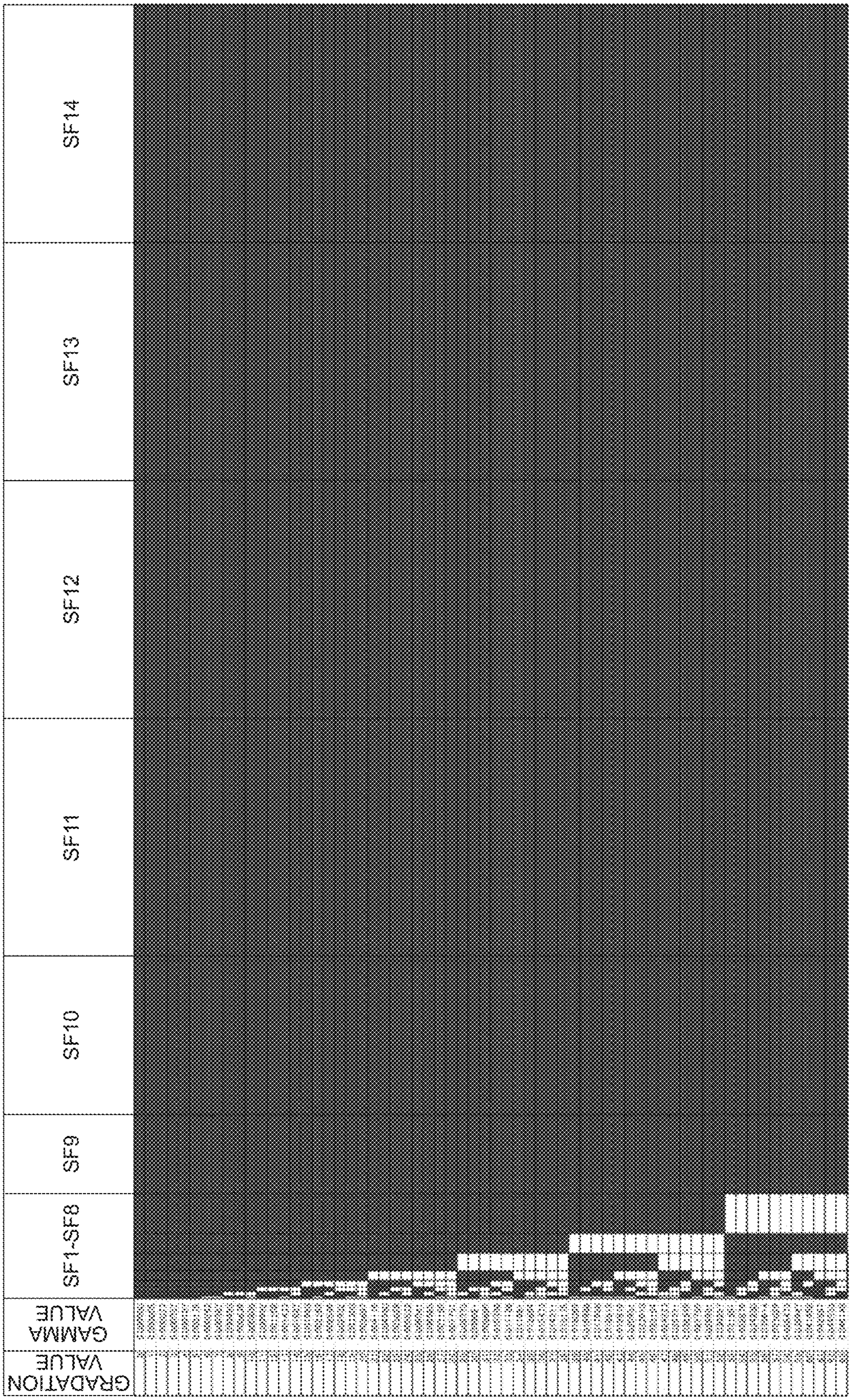
FIG. 18 is a diagram for explaining the light emission sequence for each gradation value (gradation value 0 to gradation value 63) of the display device according to the second embodiment.
Figure 19:
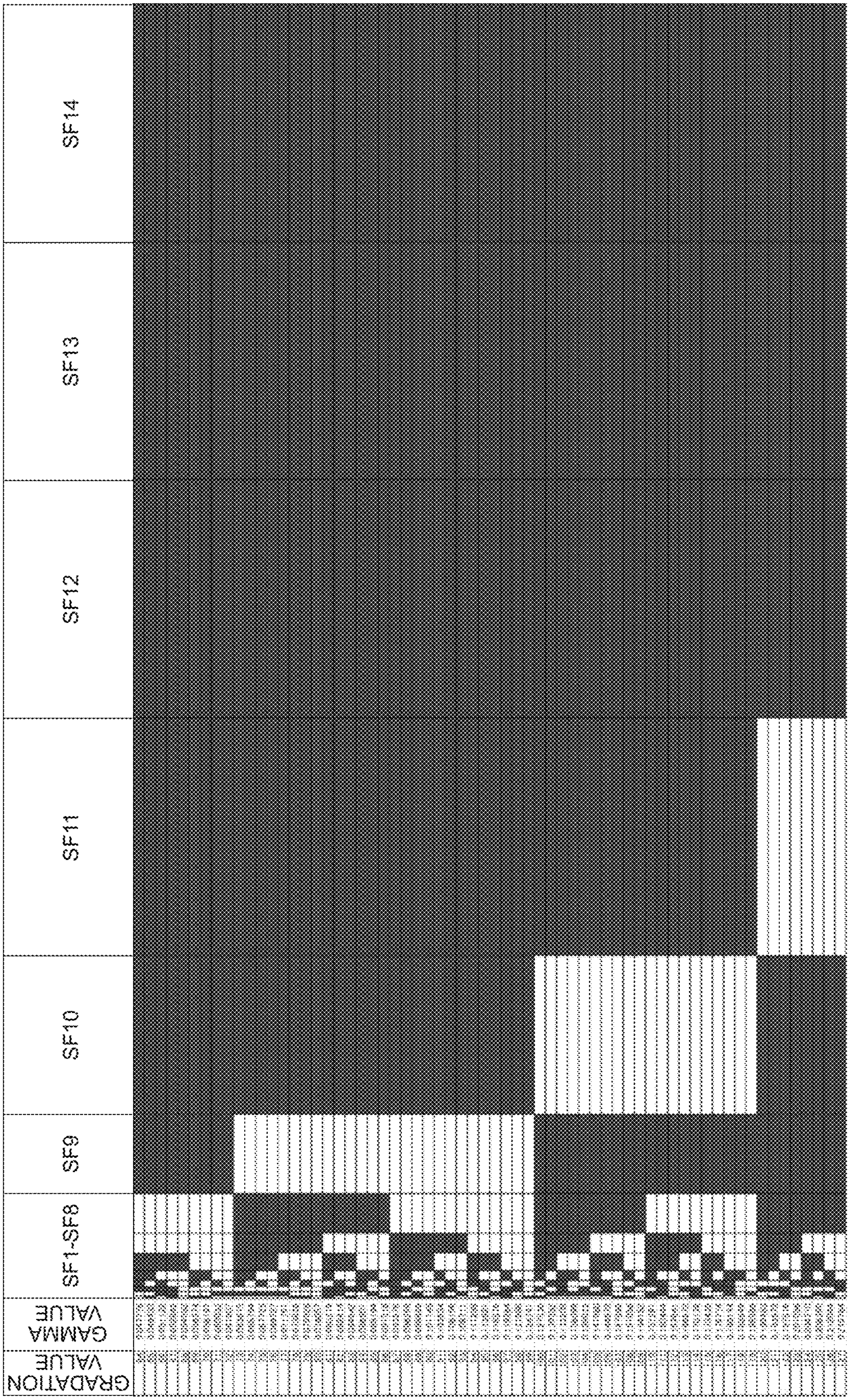
FIG. 19 is a diagram for explaining the light emission sequence for each gradation value (gradation value 64 to gradation value 127) of the display device according to the second embodiment.
Figure 20:
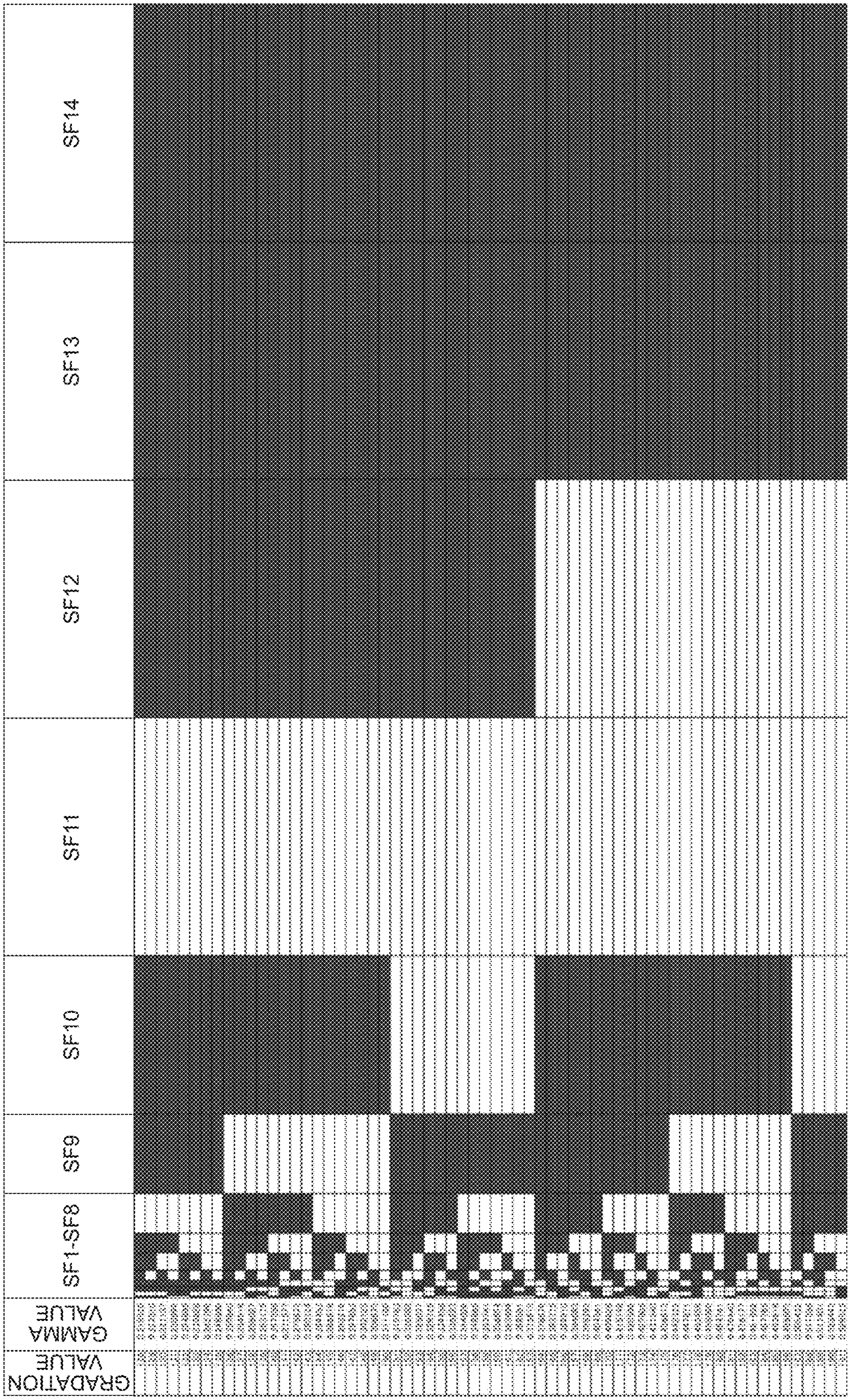
FIG. 20 is a diagram for explaining the light emission sequence for each gradation value (gradation value 128 to gradation value 191) of the display device according to the second embodiment.
Figure 21:
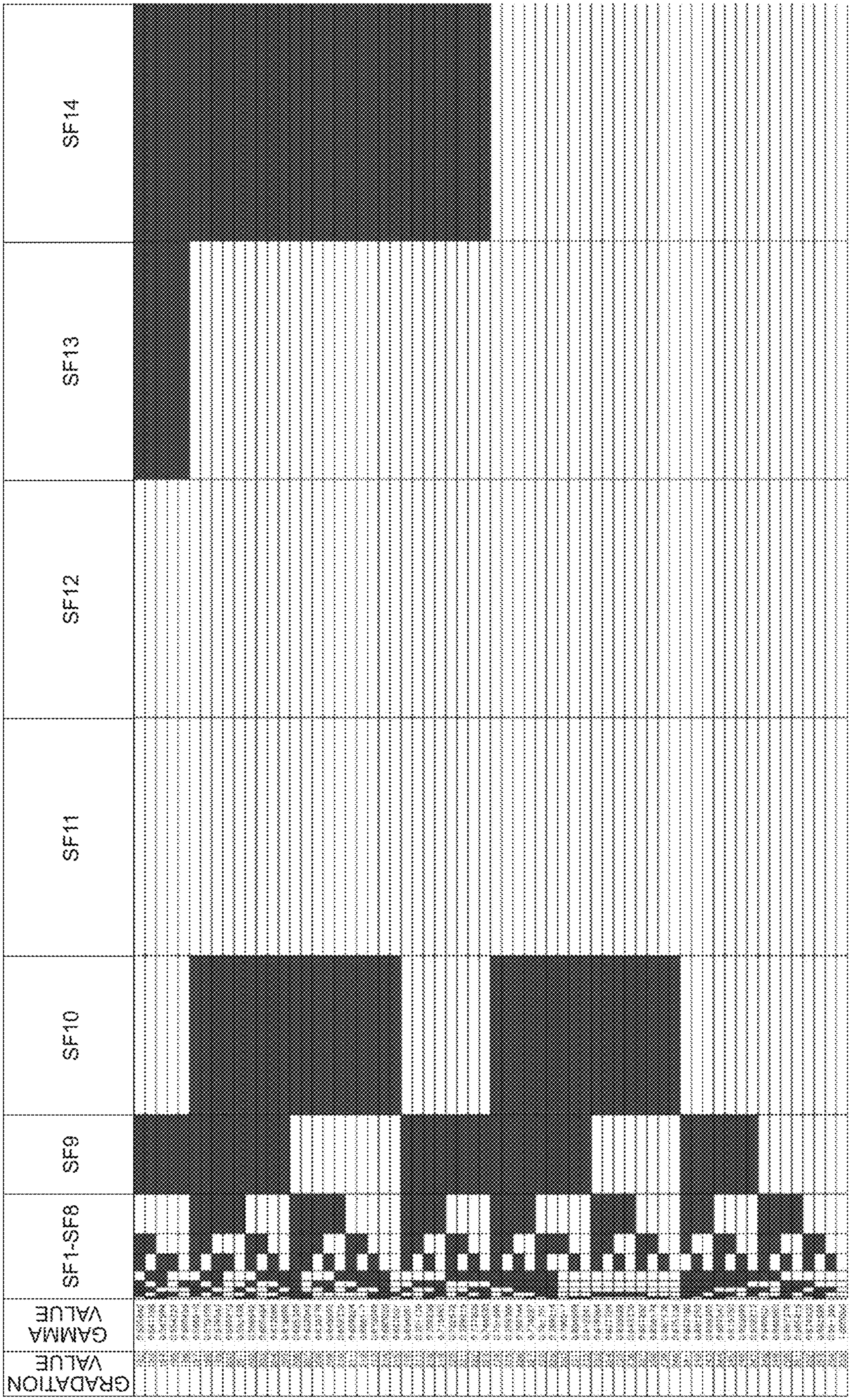
FIG. 21 is a diagram for explaining the light emission sequence for each gradation value (gradation value 192 to gradation value 255) of the display device according to the second embodiment.

FIG. 18 is a diagram for explaining the light emission sequence for each gradation value (gradation value 0 to gradation value 63) of the display device according to the second embodiment. FIG. 19 is a diagram for explaining the light emission sequence for each gradation value (gradation value 64 to gradation value 127) of the display device according to the second embodiment. FIG. 20 is a diagram for explaining the light emission sequence for each gradation value (gradation value 128 to gradation value 191) of the display device according to the second embodiment. FIG. 21 is a diagram for explaining the light emission sequence for each gradation value (gradation value 192 to gradation value 255) of the display device according to the second embodiment. FIG. 22 is a diagram for explaining the light emission sequence for each gradation value (gradation value 0 to gradation value 16) of the display device according to the second embodiment.

Similarly to FIGS. 8 to 14 described above, FIGS. 18 to 22 illustrate the gamma values and light emission/non-emission of the light-emitting elements 100 for each subframe period SF corresponding to the respective 256 gradation values (gradation value 0 to gradation value 255). The width of each subframe period SF is schematically illustrated corresponding to the length of the subframe period SF. The subframe periods SF11, SF12, SF13, and SF14 according to the present embodiment have the same width.

Similarly to FIG. 14 described above, FIG. 22 illustrates the current values (mA) of the electric current supplied to the light-emitting elements 100 in each subframe period SF. In the second embodiment, similarly to the first embodiment, the current value of the high level current IH is set to 1.0 mA, and the current values of the low level currents IL1, IL2, and IL3 are set to 0.33 mA, 0.1 mA, and 0.033 mA, respectively.

As illustrated in FIG. 22, at the gradation value 0, the light-emitting elements 100 do not emit light in all the subframe periods SF, and the lowest luminance (i.e., black) of the pixel PX is displayed. At the gradation value 1, the low level current IL3 (current value of 0.033 mA) is used, and the light-emitting elements 100 emit light in the subframe period SF1 (light emission period) and do not emit light in the subframe periods SF2 to SF14 (non-emission periods).

At the gradation value 2 to 7, the low level current IL2 (current value 0.1 mA) is used. At the gradation value 2, the light-emitting elements 100 emit light in the subframe period SF1 (light emission period) and do not emit light in the subframe periods SF2 to SF14 (non-emission periods). At the gradation value 3, the light-emitting elements 100 emit light in the subframe periods SF1 and SF2 (light emission periods) and do not emit light in the subframe periods SF3 to SF14 (non-emission periods). In the same manner, from the gradation value 4 to the gradation value 7, the combination of light emission/non-emission of the light-emitting elements 100 is set such that the total length of the subframe periods SF in which the light-emitting elements 100 emit light (light emission periods) becomes longer as the gradation value becomes larger.

At the gradation values 8 to 11, the low level current IL1 (current value 0.33 mA) is used. At the gradation value 8, the light-emitting elements 100 emit light in the subframe periods SF2 and SF3 (light emission periods) and do not emit light in the subframe period SF1 and the subframe periods SF4 to SF14 (non-emission periods). At the gradation value 9, the light-emitting elements 100 emit light in the subframe period SF1 and SF4 (light emission periods) and do not emit light in the subframe periods SF2 and SF3 and the subframe periods SF5 to SF14 (non-emission periods). In the same manner, at the gradation values 10 and 11, the combination of light emission/non-emission of the light-emitting elements 100 is set such that the total length of the subframe periods SF in which the light-emitting elements 100 emit light (light emission periods) becomes longer as the gradation value becomes larger.

At the gradation value 12 or larger, a fixed high level current IH (current value of 1.0 mA) is used as the electric current supplied to the light-emitting elements 100. At the gradation value 12, the light-emitting elements 100 emit light in the subframe periods SF1 and SF3 (light emission periods) and do not emit light in the subframe period SF2 and the subframe periods SF4 to SF14 (non-emission periods). At the gradation value 13, the light-emitting elements 100 emit light in the subframe periods SF2 and SF3 (light emission periods) and do not emit light in the subframe period SF1 and the subframe periods SF4 to SF14 (non-emission periods). In the same manner, the combination of light emission/non-emission of the light-emitting elements 100 is set such that the total length of the subframe periods SF in which the light-emitting elements 100 emit light (light emission periods) becomes longer as the gradation value becomes larger.

As illustrated in FIGS. 18 to 21, in the range of the gradation values 12 to 72, light emission/non-emission of the light-emitting elements 100 is switched for each gradation value in the subframe periods SF1 to SF8, and the light-emitting elements 100 do not emit light in the subframe periods SF9 to SF14.

In the range of the gradation values 73 to 99, light emission/non-emission of the light-emitting elements 100 is switched for each gradation value in the subframe periods SF1 to SF8. In the range of the gradation values 73 to 99, the light-emitting elements 100 emit light in the subframe period SF9. In the subframe periods SF10 to SF14, the light-emitting elements 100 do not emit light.

In the range of the gradation values 100 to 119, light emission/non-emission of the light-emitting elements 100 is switched for each gradation value in the subframe periods SF1 to SF8. In the range of the gradation values 100 to 119, the light-emitting elements 100 emit light in the subframe period SF10. In the subframe period SF9 and the subframe periods SF10 to SF14, the light-emitting elements 100 do not emit light.

In the range of the gradation values 120 to 163, light emission/non-emission of the light-emitting elements 100 is switched for each gradation value in the subframe periods SF1 to SF10. In the range of the gradation values 120 to 163, the light-emitting elements 100 emit light in the subframe period SF11. In the subframe periods SF12, SF13, and SF14, the light-emitting elements 100 do not emit light.

In the range of the gradation values 164 to 196, light emission/non-emission of the light-emitting elements 100 is switched for each gradation value in the subframe periods SF1 to SF10. In the range of the gradation values 164 to 196, the light-emitting elements 100 emit light in the subframe period SF11 and SF12. In the subframe periods SF13 and SF14, the light-emitting elements 100 do not emit light.

In the range of the gradation values 197 to 223, light emission/non-emission of the light-emitting elements 100 is switched for each gradation value in the subframe periods SF1 to SF10. In the range of the gradation values 197 to 223, the light-emitting elements 100 emit light in the subframe period SF11, SF12, and SF13. In the subframe period SF14, the light-emitting elements 100 do not emit light.

In the range of the gradation values 224 to 255, light emission/non-emission of the light-emitting elements 100 is switched for each gradation value in the subframe periods SF1 to SF10. In the range of the gradation values 224 to 255, the light-emitting elements 100 emit light in the subframe periods SF11, SF12, SF13, and SF14.

As described above, the high-order bit subframe periods SF11, SF12, SF13, and SF14 out of the 14-bit subframe periods SF have the same length, and the light-emitting elements 100 emit light in order of the subframe periods SF11, SF12, SF13, and SF14 as the gradation value increases.

Therefore, the second embodiment can suppress what is called false contours, in which gradation values significantly smaller than or significantly larger than the displayed gradation are visible depending on the direction of movement of the observer's line of sight. More specifically, as illustrated in FIGS. 19 to 21, the subframe periods SF11, SF12, SF13, and SF14 serving as the light emission periods are arranged stepwise in the high-order bit subframe periods SF11, SF12, SF13, and SF14 having a relatively long length in the light emission sequence. In other words, in the high-order bit subframe periods SF11, SF12, SF13, and SF14, the subframe periods SF serving as the light emission periods and the subframe periods SF serving as the non-emission periods are not arranged in a grid pattern between the adjacent gradations. This configuration can prevent the direction of movement of the observer's line of sight from continuously passing through the subframe periods SF serving as the non-emission periods between the adjacent pixels PX.

Figure 23:
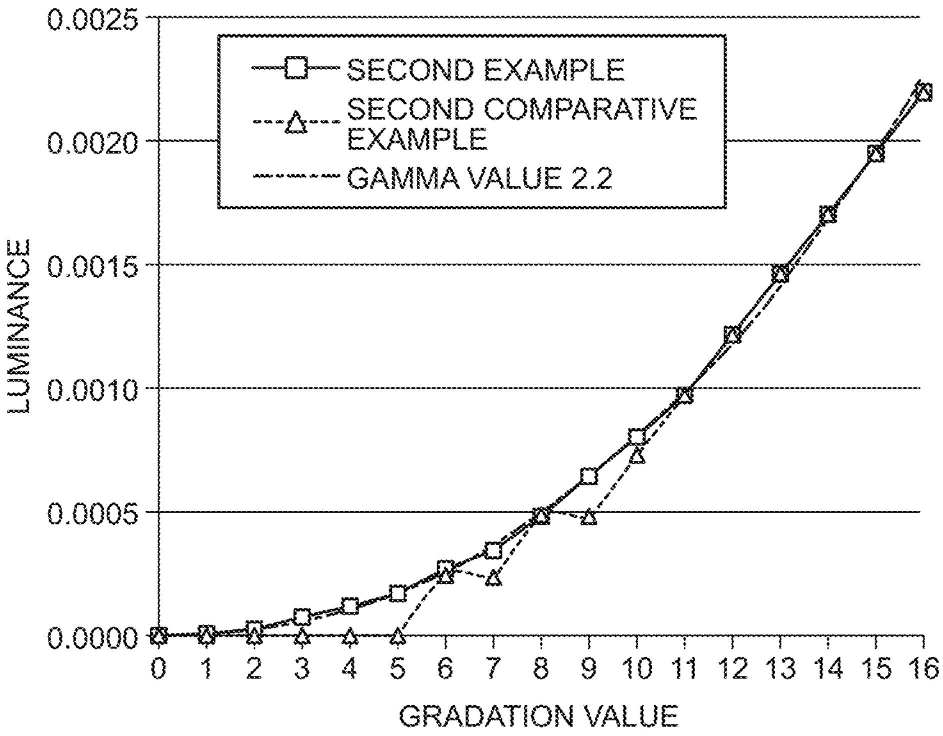
FIG. 23 is a graph of the relation between the gradation value and the luminance of the pixel of the display device according to a second example.

FIG. 23 is a graph of the relation between the gradation value and the luminance of the pixel of the display device according to a second example. FIG. 23 illustrates the simulation results of the display device according to the second example that performs multi-gradation display by making the lengths of the high-order bit subframe periods SF11, SF12, SF13, and SF14 equal and combining the current drive system and the PWM drive system according to the light emission sequence illustrated in FIGS. 18 to 22. FIG. 23 also illustrates the simulation results of the display device according to a second comparative example that does not employ the current drive system and performs multi-gradation display by the PWM drive system by fixing the electric current supplied to the light-emitting elements 100 to the high level current IH (current value of 1.0 mA). FIG. 23 illustrates the gamma curve with a gamma value of 2.2.

As illustrated in FIG. 23, the luminance value according to the second comparative example that performs multi-gradation display only by the PWM drive system satisfactorily matches the gamma curve with a gamma value of 2.2 on the high gradation side (gradation value 11 or larger). The luminance value, however, has errors with respect to the gamma curve with a gamma value of 2.2. on the low gradation side (gradation value 10 or smaller).

By contrast, it is found out that the luminance of the second example that performs multi-gradation display by combining the current drive system and the PWM drive system satisfactorily matches the gamma curve with a gamma value of 2.2 in the range of all the gradation values from the low gradation side (gradation value 10 or smaller) to the high gradation side (gradation value 11 or larger).

As described above, the display device 1 according to the present embodiment suppresses false contours and can accurately adjust the luminance of the light-emitting elements 100 and satisfactorily perform gradation control particularly on the low gradation side by gradation display by combining the current drive system and the PWM drive system.

Second Modification of the Second Embodiment

A second modification of the second embodiment describes the method for setting the combination of the pattern of light emission/non-emission for each subframe period SF and the current value (high level current IH and low level currents IL1, IL2, and IL3) supplied to the light-emitting elements 100. FIG. 24 is a diagram for explaining an example of the method for setting the current value (mA) of each subframe from gradation value 0 to gradation value 5 of the display device according to the second modification of the second embodiment. FIG. 25 is a diagram for explaining an example of the method for setting the current value (mA) of each subframe from gradation value 6 to gradation value 13 of the display device according to the second modification of the second embodiment.

FIGS. 24 and 25 are a table indicating the combination of the pattern of light emission/non-emission for each subframe period SF and the current value (high level current IH and low level currents IL1, IL2, and IL3) supplied to the light-emitting elements 100 (hereinafter referred to as the light emission sequence) for each luminance level. In a right column in FIGS. 24 and 25, light emission sequences selected as gradation values 1 to 13 out of the light emission sequences are indicated by the numbers of the respective gradation values. The ideal luminance (gamma value of 2.2) corresponding to each of the gradation values 1 to 13 is also indicated.

As illustrated in FIGS. 24 and 25, there are a plurality of combinations of the pattern of light emission/non-emission for each subframe period SF and the current value supplied to the light-emitting elements 100, and there are a plurality of light emission sequences that provide intermediate luminance between the gradation values besides the light emission sequences that provide the ideal luminance of each gradation value. As indicated by No. 3, 6, 9, 10, 12, 15, 21, 24, 28, 31, 34, and 37 in FIGS. 24 and 25, there may be a plurality of light emission sequences to achieve the same luminance.

In No. 3 in FIG. 24, for example, there are two light emission sequences to achieve luminance of 0.000024: the light emission sequence that uses the low level current IL3 (current value of 0.033 mA) and causes the subframe periods SF1 and SF2 to serve as the light emission periods (upper row of No. 3), and the light emission sequence that uses the low level current IL2 (current value of 0.1 mA) and causes the subframe period SF1 to serve as the light emission period (lower row of No. 3).

In this case, referring to the light emission sequences corresponding to the luminance levels before and after No. 3 (luminance of 0.000024), both the light emission sequences of No. 2 (luminance of 0.000016) and No. 4 (luminance of 0.000033) use the low level current IL3 (current value of 0.033 mA). In No. 3 (luminance of 0.000024), the same current value as that of the previous and subsequent luminance levels, that is, the low level current IL3 (current value of 0.033 mA) is selected, and the light emission sequence using the low level current IL2 (current value of 0.1 mA) is not selected (evaluation "×(cross)").

In No. 6, 9, and 12 in FIG. 24, there are two light emission sequences that provide the same luminance level: the light emission sequence using the low level current IL3 (current value of 0.033 mA) and the light emission sequence using the low level current IL2 (current value of 0.1 mA). In No. 10 of FIG. 24, there are two light emission sequences that provide the same luminance level: the light emission sequence using the low level current IL3 (current value of 0.033 mA) and the light emission sequence using the low level current IL1 (current value of 0.33 mA). Also in the light emission sequences indicated by No. 6, 9, 10, and 12 in FIG. 24, the light emission sequence using the same current value as that of the previous and subsequent luminance levels, that is, the low level current IL3 (current value of 0.033 mA) is selected, and the light emission sequence using the current value different from that of the previous and subsequent luminance levels is not selected.

In the light emission sequences indicated by No. 21 and 24 in FIG. 25, the light emission sequence using the same current value as that of the previous and subsequent luminance levels, that is, the low level current IL2 (current value of 0.1 mA) is selected, and the light emission sequence using the current value (current values of 1.0 mA and 0.033 mA) different from that of the previous and subsequent luminance levels is not selected.

In the light emission sequences indicated by No. 28, 31, and 34 in FIG. 25, the light emission sequence using the same current value as that of the previous and subsequent luminance levels, that is, the low level current IL1 (current value of 0.33 mA) is selected, and the light emission sequence using the current value (current value of 1.0 mA) different from that of the previous and subsequent luminance levels is not selected.

As described above, when there are a plurality of light emission sequences to achieve the same target luminance level, a current value equal to at least one of the current value of the high level current IH or the low level currents IL of the light emission sequence on the high gradation side and the current value of the high level current IH or the low level currents IL of the light emission sequence on the low gradation side at the gradations (luminance levels) adjacent to the target luminance level is selected. More preferably, the low level current IL1, IL2, or IL3 having the same current value as that of the adjacent luminance levels on the high gradation side and the low gradation side is supplied to the light-emitting elements 100. Therefore, if the luminance of the light-emitting elements 100 varies depending on the supplied current value, the display device 1 can suppress errors in luminance of the light-emitting elements 100 at the adjacent gradation values (luminance levels).

In No. 15 in FIG. 24, there are two light emission sequences to achieve luminance of 0.000122: the light emission sequence that uses the low level current IL3 (current value of 0.033 mA) and causes the subframe periods SF1, SF2, SF3 and SF4 to serve as the light emission periods (upper row of No. 15), and the light emission sequence that uses the low level current IL2 (current value of 0.1 mA) and causes the subframe periods SF1 and SF3 to serve as the light emission periods (lower row of No. 15).

Referring to the light emission sequences corresponding to the luminance levels before and after No. 15 (luminance of 0.000122), No. 14 (luminance of 0.000114) uses the low level current IL3 (current value of 0.033 mA), and No. 16 (luminance of 0.000146) uses the low level current IL2 (current value of 0.1 mA). Therefore, in No. 15, either the light emission sequence using the low level current IL3 (current value of 0.033 mA) or the light emission sequence using the low level current IL2 (current value of 0.1 mA) can be selected (evaluation "Δ (triangle)").

Similarly, in the light emission sequence of No. 37 illustrated in FIG. 25, either the light emission sequence using the low level current IL1 (current value of 0.33 mA) (upper row of No. 37) or the light emission sequence using the high level current IH (current value of 1.0 mA) (lower row of No. 37) can be selected.

The light emission sequence for each luminance level (combination of the pattern of light emission/non-emission for each subframe period SF and the current value (high level current IH and low level currents IL1, IL2, and IL3) supplied to the light-emitting elements 100) selected in the manner described above is stored in advance in the storage circuit 204 (refer to FIG. 7).

The method for setting the light emission sequence described in the second modification of the second embodiment can also be applied to the first embodiment described above.

Third Modification of the Second Embodiment

FIG. 26 is a diagram for explaining the light emission sequence for each gradation value (gradation value 0 to gradation value 16) of the display device according to a third modification of the second embodiment. While the second embodiment uses a total of four levels of current values of the high level current IH (current value of 1.0 mA) and the low level currents IL1, IL2, and IL3 (current values of 0.33 mA, 0.1 mA, and 0.033 mA) as the light emission sequence, for example, the embodiment is not limited thereto.

As illustrated in FIG. 26, in the third modification of the second embodiment, the current value of the high level current IH is set to 0.33 mA, and the current values of the low level currents IL1 and IL2 are set to 0.1 mA and 0.033 mA, respectively. In other words, the third modification uses a total of three levels of current values as the current value supplied to the light-emitting elements 100 at each gradation value.

More specifically, at the gradation value 0, the light-emitting elements 100 do not emit light in all the subframe periods SF (non-emission periods), and the lowest luminance (i.e., black) of the pixel PX is displayed. At the gradation values 1 to 6, the low level current IL2 (current value 0.033 mA) is used. At the gradation value 1, the light-emitting elements 100 emit light in the subframe period SF1 (light emission period) and do not emit light in the subframe periods SF2 to SF14 (non-emission periods). At the gradation value 2, the light-emitting elements 100 emit light in the subframe period SF2 (light emission period) and do not emit light in the subframe period SF1 and the subframe periods SF3 to SF14 (non-emission periods). In the same manner, from the gradation value 3 to the gradation value 6, the combination of light emission and non-emission of the light-emitting elements 100 is set such that the total length of the subframe periods SF in which the light-emitting elements 100 emit light (light emission periods) becomes longer as the gradation value becomes larger.

At the gradation values 7 to 10, the low level current IL1 (current value 0.1 mA) is used. At the gradation value 7, the light-emitting elements 100 emit light in the subframe periods SF1 and SF3 (light emission periods) and do not emit light in the subframe period SF2 and the subframe periods SF4 to SF14 (non-emission periods). At the gradation value 8, the light-emitting elements 100 emit light in the subframe periods SF1, SF2, and SF3 (light emission periods) and do not emit light in the subframe periods SF4 to SF14 (non-emission periods). In the same manner, at the gradation values 9 and 10, the combination of light emission and non-emission of the light-emitting elements 100 is set such that the total length of the subframe periods SF in which the light-emitting elements 100 emit light (light emission periods) becomes longer as the gradation value becomes larger.

At the gradation value 11 or larger, a fixed high level current IH (current value of 0.33 mA) is used as the electric current supplied to the light-emitting elements 100. At the gradation value 11, the light-emitting elements 100 emit light in the subframe period SF3 (light emission period) and do not emit light in the subframe periods SF1 and SF2 and the subframe periods SF4 to SF14 (non-emission periods). At the gradation value 12, the light-emitting elements 100 emit light in the subframe periods SF1 and SF3 (light emission periods) and do not emit light in the subframe period SF2 and the subframe periods SF4 to SF14 (non-emission periods). In the same manner, the combination of light emission and non-emission of the light-emitting elements 100 is set such that the total length of the subframe periods SF in which the light-emitting elements 100 emit light (light emission periods) becomes longer as the gradation value becomes larger.

Figure 27:
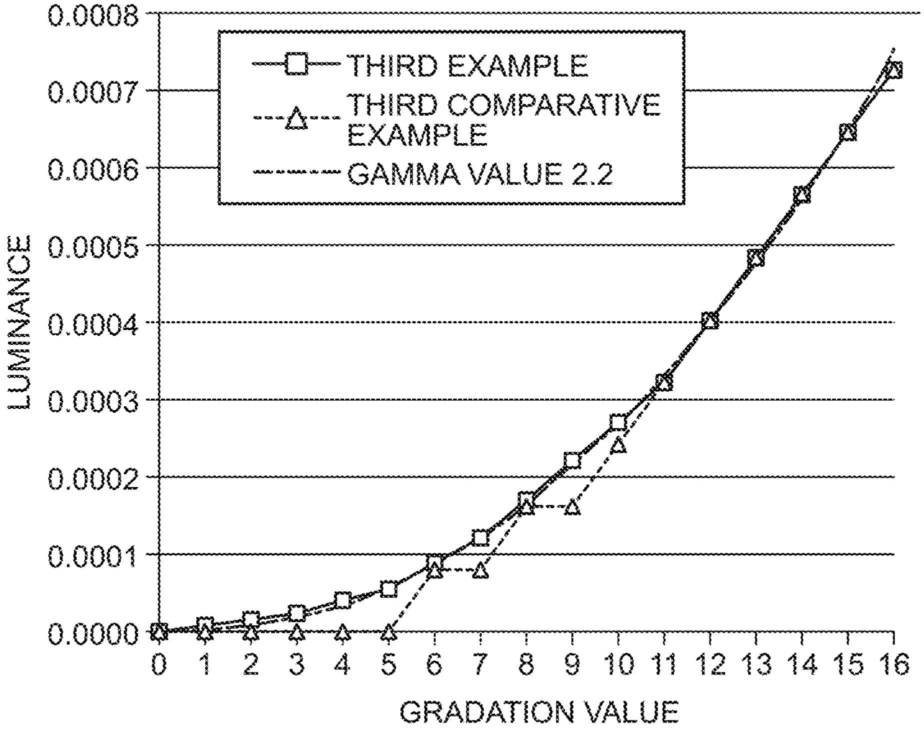
FIG. 27 is a graph of the relation between the gradation value and the luminance of the pixel of the display device according to a third example.

FIG. 27 is a graph of the relation between the gradation value and the luminance of the pixel of the display device according to a third example. FIG. 27 illustrates the simulation results of the display device according to the third example that performs multi-gradation display by using a total of three levels of current values of the high level current IH and the low level currents IL1 and IL2 and combining the current drive system and the PWM drive system according to the light emission sequence illustrated in FIG. 26. FIG. 27 also illustrates the simulation results of the display device according to a third comparative example that does not employ the current drive system and performs multi-gradation display by the PWM drive system by fixing the electric current supplied to the light-emitting elements 100 to the high level current IH (current value of 0.33 mA). FIG. 27 illustrates the gamma curve with a gamma value of 2.2.

As illustrated in FIG. 27, the luminance value according to the third comparative example that performs multi-gradation display only by the PWM drive system satisfactorily matches the gamma curve with a gamma value of 2.2 on the high gradation side (gradation value 11 or larger). The luminance value, however, has errors with respect to the gamma curve with a gamma value of 2.2. on the low gradation side (gradation value 10 or smaller).

By contrast, it is found out that the luminance of the third example that performs multi-gradation display by combining the current drive system and the PWM drive system satisfactorily matches the gamma curve with a gamma value of 2.2 in the range of all the gradation values from the low gradation side (gradation value 10 or smaller) to the high gradation side (gradation value 11 or larger).

As described above, in the third modification of the second embodiment, the current value of the high level current IH is reduced to 0.33 mA compared to the second embodiment, and the low level currents IL1 and IL2 (current values of 0.1 mA and 0.033 mA) are set to two levels, whereby a total of three levels of current values are used in the light emission sequence. Also in the present modification, the display device 1 can accurately adjust the luminance of the light-emitting elements 100 and satisfactorily perform gradation control particularly on the low gradation side by combining the current drive system and the PWM drive system.

The current value of the high level current IH according to the present modification is different from that according to the second embodiment described above. With this configuration, if the maximum current value differs depending on the type, such as color, of the light-emitting elements 100 (light-emitting elements 100R, 100G, and 100B (refer to FIG. 2), the light emission sequence can be set using the high level current IH suitable for each of the light-emitting elements 100R, 100G, and 100B). For example, the high level current IH having a current value of 1.0 mA can be used for the light-emitting element 100G, and the high level current IH having a current value of 0.33 mA can be used for the light-emitting elements 100R and 100B. Therefore, the present modification can accurately adjust the luminance of the light-emitting elements 100 for each color.

Fourth Modification of the Second Embodiment

Figure 28:
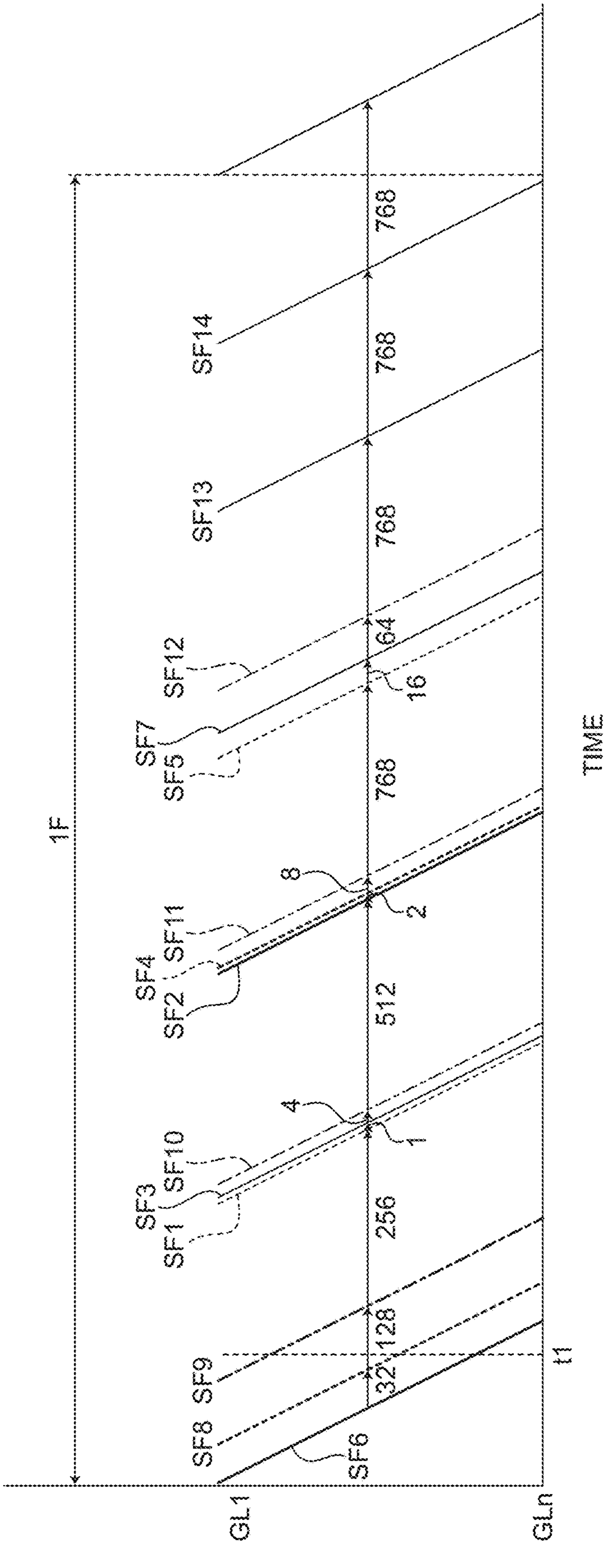
FIG. 28 is a timing chart for explaining the method for driving the display device according to a fourth modification of the second embodiment.

FIG. 28 is a timing chart for explaining the method for driving the display device according to a fourth modification of the second embodiment. As illustrated in FIG. 28, in the display device 1 according to the fourth modification of the second embodiment, the subframe periods SF6, SF8, SF9, SF1, SF3, SF10, SF2, SF4, SF11, SF5, SF7, SF12, SF13, and SF14 are arranged in this order on the time axis in one frame period 1F.

In the present modification, the high-order bit subframe periods SF11, SF12, SF13, and SF14 are set to the same length. The arrangement relation between the high-order bit subframe periods SF (e.g., the subframe periods SF9 to SF14) and the low-order bit subframe periods SF (e.g., the subframe periods SF1 to SF8) according to the present modification is the same as that according to the first modification of the first embodiment described above (FIG. 16), and repeated explanation thereof is omitted. Also in the present modification, the number of scanning lines GL selected at the same timing (e.g., time t1) is reduced to three.

Third Embodiment

Figure 29:
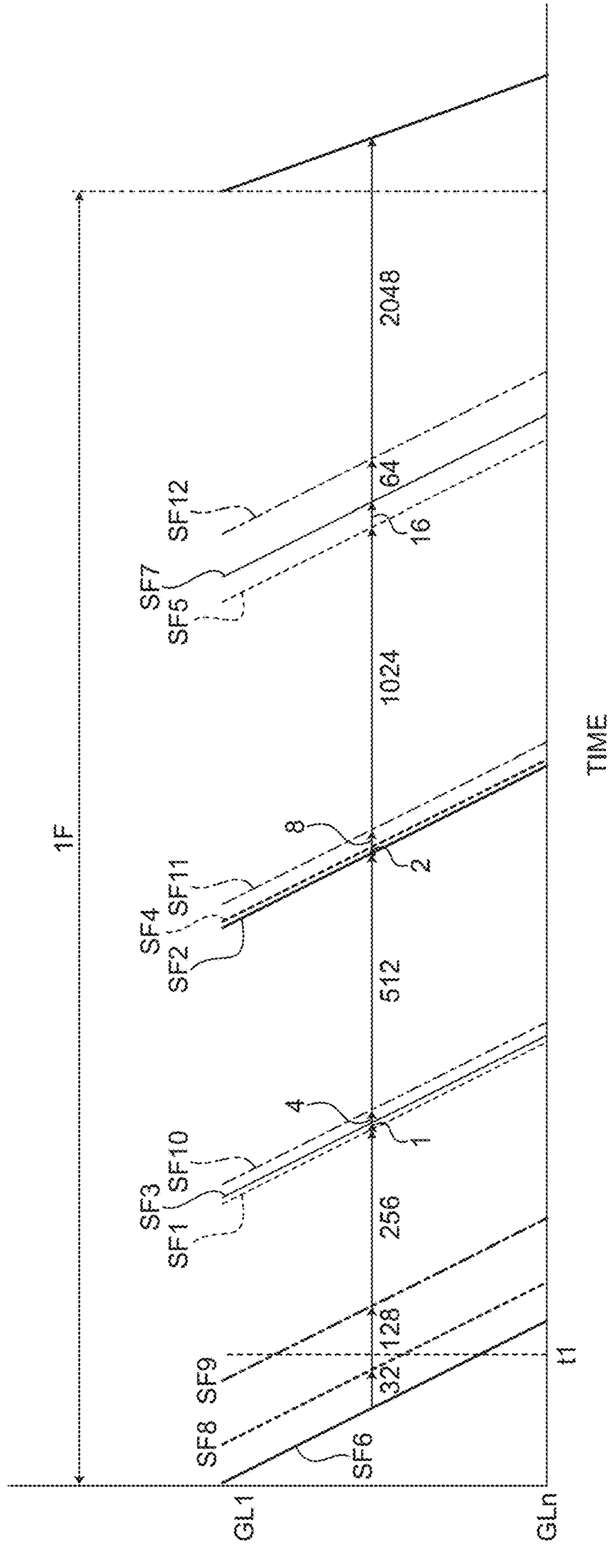
FIG. 29 is a timing chart for explaining the method for driving the display device according to a third embodiment.

FIG. 29 is a timing chart for explaining the method for driving the display device according to a third embodiment. As illustrated in FIG. 29, in the display device 1 according to the third embodiment, one frame period 1F is divided into subframe periods SF1 to SF12 corresponding to 12-bit gradation values.

In one frame period 1F, the subframe periods SF6, SF8, SF9, SF1, SF3, SF10, SF2, SF4, SF11, SF5, SF7, and SF12 are arranged in this order on the time axis.

Also in the case where one frame period 1F is composed of the 12-bit subframe periods SF, the arrangement of the high-order bit subframe periods SF (e.g., the subframe periods SF9 to SF12) and the low-order bit subframe periods SF (e.g., the subframe periods SF1 to SF8) is the same as that according to the first modification of the first embodiment and the fourth modification of the second embodiment described above, and repeated explanation thereof is omitted. Also in the present modification, the number of scanning lines GL selected at the same timing (e.g., time t1) is reduced to three.

One frame period 1F is not necessarily divided into 14-bit subframe periods SF as described in the first and the second embodiments and may be divided into 12-bit subframe periods SF as illustrated in FIG. 29. Similarly to the examples described above, the present embodiment can also set the light emission sequence for each gradation value and perform multi-gradation display by combining the current drive system and the PWM drive system.

While exemplary embodiments according to the present invention have been described, the embodiments are not intended to limit the invention. The contents disclosed in the embodiments are given by way of example only, and various modifications may be made without departing from the spirit of the present invention. Appropriate modifications made without departing from the spirit of the present invention naturally fall within the technical scope of the invention. At least one of various omissions, substitutions, and modifications of the components may be made without departing from the gist of the embodiments above and the modification thereof.

What is claimed is:

1. A display device comprising:

a plurality of light-emitting elements; and a control circuit configured to control drive of the light-emitting elements, wherein the control circuit divides one frame period into a plurality of subframe periods having different lengths and controls light emission and non-emission of the light-emitting elements for each of the subframe periods, the control circuit has, as a system for driving the light-emitting elements, a first display drive system that supplies a fixed high level current to at least one first light-emitting element that emits light among the light-emitting elements and changes a length of a first light emission period in which the first light-emitting element emits light, and the control circuit has a second display drive system that supplies one low level current selected from a plurality of low level currents each having a current value smaller than a current value of the high level current and set to different current values to at least one second light-emitting element that emits light among the light-emitting elements and changes a length of a second light emission period in which the second light-emitting element emits light.

2. The display device according to claim 1, wherein the low level current having a same current value is supplied to the second light-emitting element in the subframe periods corresponding to one gradation value in the second display drive system.

3. The display device according to claim 1, wherein the current value of the low level currents is a value obtained by multiplying the current value of the high level current by $(1/2)^n$ or $(1/3)^n$ (where n is a natural number).

4. The display device according to claim 1, wherein the subframe periods include at least one first subframe period and a plurality of second subframe periods, a first length of the first subframe period is the shortest among the subframe periods, a second length of each of the second subframe periods is longer than the first length, and the second length is a value obtained by multiplying the first length by $2^n$ (where n is a natural number).

5. The display device according to claim 1, wherein the subframe periods have different lengths than each other.

6. The display device according to claim 1, wherein the one frame period includes the subframe periods of 14, and the subframe periods of 14 have different lengths than each other.

7. The display device according to claim 1, wherein the one frame period includes the subframe periods of 12, and the subframe periods of 12 have different lengths than each other.

8. The display device according to claim 1, wherein the subframe periods include a third subframe period with a third length, a fourth subframe period with a fourth length, and a fifth subframe period with a fifth length, the third subframe period, the fourth subframe period, and the fifth subframe period are continuous in this order, the fourth length is twice as the third length, and the fifth length is twice as the fourth length.

9. The display device according to claim 1, wherein the subframe periods include a first subframe period group and a second subframe period group following the first subframe period group, the first subframe period group is continuous and includes a plurality of sixth subframe periods that have different lengths than each other, and the second subframe period group is continuous and includes a plurality of seventh subframe periods that have same lengths.

10. The display device according to claim 9, wherein the first subframe period group has a subframe positioned at a beginning of the first frame period, and the second subframe period group has a subframe positioned at an end of the first frame period.

11. The display device according to claim 1, wherein there are a plurality of combinations to achieve a same target luminance level as a combination of the current value of the high level current or the low level currents and the subframe periods serving as a light emission period in which one of the light-emitting elements emits light, and the high level current or the low level current having the current value equal to at least one of the current value of the high level current or the low level currents at a gradation adjacent to the target luminance level on a high gradation side and the current value of the high level current or the low level currents at a gradation adjacent to the target luminance level on a low gradation side is selected, and supplied to the one light-emitting element.

12. The display device according to claim 1, wherein the subframe periods have a eighth subframe period and a ninth period with a length equal to or larger than a predetermined period, and a third subframe period group with a length smaller than the predetermined period, and at least one subframe period included in the third subframe period group is positioned between the eighth subframe period and the ninth subframe period.

13. The display device according to claim 1 comprising:

a plurality of scanning lines and a plurality of signal lines;

a plurality of drive transistors provided to the respective light-emitting elements;

a scanning line drive circuit coupled to the scanning lines and configured to select the light-emitting elements for each of the subframe periods in a time-division manner; and a signal line drive circuit configured to supply gradation voltage to the drive transistors, wherein the high level current or the low level current corresponding to the gradation voltage is supplied to at least one selected light-emitting element among the light-emitting elements.

14. The display device according to claim 1, wherein the first display drive system and the second display drive system are implemented in the one frame period.

15. The display device according to claim 1, wherein the first light-emitting element is same as the second light-emitting element.

16. A display device comprising:

a pixel including a light-emitting element, a transistor coupled to the light- emitting element; and a signal line coupled to a gate electrode of the transistor, wherein a first voltage, a second voltage lower than the first voltage, and a third voltage lower than the second voltage are configured to be applied to the signal line, one frame period includes a plurality of subframe periods, the subframe periods have at least one first subframe period in which the light-emitting element emits light and at least one second subframe period in which the light-emitting element does not emit light, the display device has a first display mode and a second display mode, in the first display mode, the first voltage is supplied to the signal line and the transistor is turned on in the at least one first subframe period, and the transistor is turned off in the at least one second subframe period, in the second display mode, a low voltage lower than the first voltage is applied to the signal line and the transistor is turned on in the at least one first subframe period, and the transistor is turned off in the at least one second subframe period, the second display mode includes a case where the low voltage is the second voltage and a case where the low voltage is the third voltage, and the subframe periods have a third subframe period with a first length and a fourth subframe period with a second length different from the first length.

17. The display device according to claim 16, wherein the display device has a first frame period in which the pixel is a first luminance and a second frame period in which the pixel is a second luminance lower than the first luminance, in the first frame period, the first display mode is used to display the pixel and the second display mode is not used, in the second frame period, at least the second display mode is used to display the pixel, and a subframe period in which the light-emitting element emits light in the first frame period is different from a subframe period in which the light-emitting element emits light in the second frame period.

18. The display device according to claim 16, wherein the at least one first subframe period has a plurality of first subframe periods, and in the second display mode, a same voltage is applied to the signal line in the first subframe periods.

19. The display device according to claim 16, wherein the subframe periods have different lengths than each other.

20. The display device according to claim 16, wherein the low voltage is one voltage selected from predetermined voltages including the second voltage and the third voltage, and in response to luminance displayed by the pixel, the selected one voltage, and a subframe period in which the light-emitting element emits light are determined.

* * * * *